(12) United States Patent
Nozaki et al.

(10) Patent No.: US 9,546,413 B2
(45) Date of Patent: *Jan. 17, 2017

(54) HOT-ROLLED STEEL SHEET AND PRODUCTION METHOD THEREOF

(75) Inventors: Takayuki Nozaki, Tokyo (JP); Manabu Takahashi, Tokyo (JP); Nobuhiro Fujita, Tokyo (JP); Hiroshi Yoshida, Tokyo (JP); Shinichiro Watanabe, Tokyo (JP); Takeshi Yamamoto, Tokyo (JP); Chisato Wakabayashi, Tokyo (JP); Riki Okamoto, Tokyo (JP); Kohichi Sano, Tokyo (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 593 days.

This patent is subject to a terminal disclaimer.

(21) Appl. No.: 14/007,583

(22) PCT Filed: Mar. 28, 2012

(86) PCT No.: PCT/JP2012/058160
§ 371 (c)(1),
(2), (4) Date: Sep. 25, 2013

(87) PCT Pub. No.: WO2012/133540
PCT Pub. Date: Oct. 4, 2012

(65) Prior Publication Data
US 2014/0014236 A1 Jan. 16, 2014

(30) Foreign Application Priority Data
Mar. 28, 2011 (JP) ................. 2011-070725

(51) Int. Cl.
C22C 38/26 (2006.01)
C21D 8/02 (2006.01)
C22C 38/00 (2006.01)
C22C 38/02 (2006.01)
C22C 38/04 (2006.01)
C22C 38/06 (2006.01)
C22C 38/12 (2006.01)
C22C 38/14 (2006.01)
C22C 38/08 (2006.01)
C22C 38/10 (2006.01)
(Continued)

(52) U.S. Cl.
CPC ............. *C22C 38/26* (2013.01); *B32B 15/013* (2013.01); *C21D 8/0226* (2013.01); *C21D 8/0263* (2013.01); *C21D 8/0463* (2013.01); *C21D 9/46* (2013.01); *C22C 38/001* (2013.01); *C22C 38/002* (2013.01); *C22C 38/005* (2013.01); *C22C 38/008* (2013.01); *C22C 38/02* (2013.01); *C22C 38/04* (2013.01); *C22C 38/06* (2013.01); *C22C 38/08* (2013.01); *C22C 38/10* (2013.01); *C22C 38/12* (2013.01); *C22C 38/14* (2013.01); *C22C 38/16* (2013.01); *C22C 38/28* (2013.01); *C22C 38/34* (2013.01); *C22C 38/38* (2013.01); *C22C 38/60* (2013.01); *C23C 2/02* (2013.01); *C23C 2/06* (2013.01); *C23C 2/28* (2013.01); *C23C 2/40* (2013.01); *C21D 2201/05* (2013.01); *C21D 2211/002* (2013.01); *C21D 2211/005* (2013.01); *C21D 2211/009* (2013.01)

(58) Field of Classification Search
CPC .... C22C 38/001; C22C 38/002; C22C 38/005; C22C 38/008; C22C 38/02; C22C 38/04; C22C 38/06; C22C 38/08; C22C 38/10; C22C 38/12; C22C 38/14; C22C 38/16; C22C 38/26; C22C 38/28; C22C 38/34; C22C 38/38; C22C 38/60; C21D 8/0226; C21D 8/0263; C21D 8/0463; C21D 9/46; C21D 2201/002; C21D 2201/005; C21D 2201/009; C21D 2201/05; C23C 2/02; C23C 2/06; C23C 2/28; C23C 2/40; B32B 15/013
See application file for complete search history.

(56) References Cited

U.S. PATENT DOCUMENTS

2003/0196735 A1 10/2003 Sugiura et al.
2004/0244877 A1 12/2004 Yokoi et al.
(Continued)

FOREIGN PATENT DOCUMENTS

CN 1462317 A 12/2003
CN 1599802 A 3/2005
(Continued)

OTHER PUBLICATIONS

Hayashi et al., English machine translation of JP 2009-030159, Feb. 2009, p. 1-70.*
(Continued)

*Primary Examiner* — Roy King
*Assistant Examiner* — Caitlin Kiechle
(74) *Attorney, Agent, or Firm* — Birch, Stewart, Kolasch & Birch, LLP

(57) ABSTRACT

Disclosed is a hot-rolled steel sheet including, by mass %, C:0.02% to 0.5% of C, and the sum of the content of Si and the content of Al is 1.0% to 4.0%. An average pole density of an orientation group from {100}<011> to {223}<110> is 1.0 to 6.5, and a pole density of a crystal orientation {332}<113> is 1.0 to 5.0. A microstructure includes, by of an area ratio, 2% to 30% of retained austenite, 20% to 50% of ferrite, and 10% to 60% of bainite. rC that is a Lankford value in a direction orthogonal to a rolling direction is 0.70 to 1.10, and r30 that is a Lankford value in a direction forming an angle of 30° with the rolling direction is 0.70 to 1.10.

20 Claims, 4 Drawing Sheets

(51) Int. Cl.

| | |
|---|---|
| *C22C 38/16* | (2006.01) |
| *C22C 38/28* | (2006.01) |
| *C22C 38/34* | (2006.01) |
| *C22C 38/38* | (2006.01) |
| *C21D 9/46* | (2006.01) |
| *B32B 15/01* | (2006.01) |
| *C22C 38/60* | (2006.01) |
| *C23C 2/02* | (2006.01) |
| *C23C 2/06* | (2006.01) |
| *C23C 2/28* | (2006.01) |
| *C23C 2/40* | (2006.01) |
| *C21D 8/04* | (2006.01) |

(56) References Cited

U.S. PATENT DOCUMENTS

| | | |
|---|---|---|
| 2007/0089814 A1 | 4/2007 | Sugiura et al. |
| 2008/0202639 A1 | 8/2008 | Tomida et al. |
| 2009/0223609 A1 | 9/2009 | Hakomori et al. |
| 2011/0036465 A1 | 2/2011 | Kawasaki et al. |
| 2013/0192724 A1 | 8/2013 | Tanaka et al. |
| 2014/0000765 A1 | 1/2014 | Nozaki et al. |

FOREIGN PATENT DOCUMENTS

| | | |
|---|---|---|
| CN | 101535519 A | 9/2009 |
| CN | 103476960 A | 12/2013 |
| EP | 1201780 A1 | 5/2002 |
| EP | 1327695 A1 | 7/2003 |
| EP | 1362930 A1 | 11/2003 |
| EP | 2 088 218 A1 | 8/2009 |
| EP | 2264206 A1 | 3/2010 |
| JP | 61-217529 A | 9/1986 |
| JP | 5-59429 A | 3/1993 |
| JP | 2001-89811 A | 4/2001 |
| JP | 2002-97545 A | 4/2002 |
| JP | 2002-115025 A | 4/2002 |
| JP | 2003-113440 A | 4/2003 |
| JP | 2003-293083 A | 10/2003 |
| JP | 2004-35905 A | 2/2004 |
| JP | 2004-250743 A | 9/2004 |
| JP | 2004-250744 A | 9/2004 |
| JP | 2005-256020 A | 9/2005 |
| JP | 2005-314798 A | 11/2005 |
| JP | 2006-22349 A | 1/2006 |
| JP | 2007-146275 A | 6/2007 |
| JP | 2007-162078 A | 6/2007 |
| JP | 2007-291514 A | 11/2007 |
| JP | 2008-274395 A | 11/2008 |
| JP | 2009-13478 A | 1/2009 |
| JP | 2009-30159 A | 2/2009 |
| JP | 2009-114523 A | 5/2009 |
| JP | 2009-132981 A | 6/2009 |
| JP | 2009-263718 A | 11/2009 |
| JP | 2010-53387 A | 3/2010 |
| JP | 2010-59452 A | 3/2010 |
| KR | 10-0754035 B1 | 9/2007 |
| KR | 10-2010010169 | 9/2010 |
| RU | 2294386 C2 | 2/2007 |
| RU | 2 312 163 C2 | 12/2007 |
| RU | 2323983 C2 | 5/2008 |
| RU | 2 403 291 C2 | 11/2010 |
| TW | 200938640 A | 9/2009 |
| TW | 201114921 A1 | 5/2011 |
| WO | 2009/099251 A1 | 8/2009 |
| WO | 2011/148490 A1 | 12/2011 |
| WO | 2012/014926 A1 | 2/2012 |

OTHER PUBLICATIONS

Taiwanese Office Action for Taiwanese Application No. 101110980, dated Jan. 14, 2014, with an English translation.
Extended European Search Report, dated Nov. 5, 2014, for European Application No. 12763971.4.
Extended European Search Report, dated Nov. 7, 2014, for European Application No. 12762991.3.
Korean Notice of Allowance for Korean Application No. 10-2013-7024766, dated Apr. 14, 2015, with an English translation.
Katoh et al., "Development of New High-Strength Hot-Rolled Steel Sheets", Steel-manufacturing studies (seitetu kenkyu), vol. 312, 1984, pp. 41-50.
NFG Catalog, Nakayama Steel Works, Ltd., http://www.nakayama-steel.co.jp/menu/product/nfg.html, Sep. 5, 2012.
PCT/ISA/210—International Search Report mailed on Jun. 26, 2012, issued in PCT/JP2012/058160.
PCT/ISA/210—International Search Report mailed on Jun. 26, 2012, issued in PCT/JP2012/058199.
Sugimoto et al., "Stretch-flangeability of a High-strength TRIP Type Bainitic Sheet Steel", ISIJ International, vol. 40, No. 9, 2000, pp. 920-926.
Takahashi et al., "High Strength Hot-rolled Steel Sheets for Automobiles", Nippon Steel Corporation Technical Report, No. 378, 2003, pp. 7-11.
Notice of Allowance dated Apr. 1, 2014 issued in Japanese Patent Application No. 2011-035776.
Chinese Office Action and Seach Report, dated Jan. 16, 2015, for Chinese Application No. 201280024780.2 with English translation.
International Search Report issued in PCT/JP2012/063261 mailed Aug. 21, 2012.
Office Action issued in Japanese Patent Application No. 2011-032465 mailed Aug. 27, 2013.
Russian Notice of Allowance, dated Jan. 19, 2015, for Russian Application No. 2013151804/02 with English translation.
Chinese Office Action issued on Jan. 13, 2015 in Chinese Patent Application No. 201280024587.9.
European Search Report issued on Nov. 26, 2014 in European Patent Application No. 12789266.9.
International Search Report issued on Aug. 21, 2012 in PCT/JP2012/063273 (Form PCT/ISA/210).
Koji Kishida; High Strength Steel Sheets for Light Weight Vehicle; Nippon Steel Corporation Technical Report; No. 371, pp. 13-17, 1999.
Korean Notice of Allowance issued on Mar. 25, 2016 in Korean Patent Application No. 10-2013-7030692.
Osamu Matsumura et al.; Enhancement of Elongation by Retained Austenite in Intercritical Annealed 0.4C-1.5Si-0.8Mn Steel; Transactions ISIJ; vol. 27; pp. 570-579; 1987.
Russian Office Action issued on Apr. 22, 2015 in Russian Application No. 2013151463.
Taiwanese Office Action issued on Jan. 17, 2014 in Taiwanese Patent Application No. 101118534.
US Non-Final Office Action dated Sep. 12, 2016, issued in U.S. Appl. No. 14/004,562.

\* cited by examiner

HOT-ROLLED STEEL SHEET AND PRODUCTION METHOD THEREOF

TECHNICAL FIELD

The present invention relates to a hot-rolled steel sheet which is excellent in local deformability such as bendability, stretch flangeability, burring workability, and hole expansibility, and azimuthal dependence of formability is small, and which is excellent in ductility, and a production method thereof. Particularly, the present invention relates to a steel sheet using a Transformation Induced Plasticity (TRIP) phenomenon.

Priority is claimed on Japanese Patent Application No. 2011-070725, filed on Mar. 28, 2011, and the content of which is incorporated herein by reference.

BACKGROUND ART

So as to suppress carbon dioxide emissions from vehicles, weight saving of a vehicle body using a high-strength steel sheet has been in progress. In addition, in order to secure safety of passengers, besides a soft steel sheet, a high-strength steel sheet is frequently used for the vehicle body. Furthermore, for the weight saving of the vehicle body to progress in the future, it is necessary to increase a strength of the high-strength steel sheet in use further than that of the related art. Accordingly, for example, so as to use the high-strength steel sheet for underbody components, it is necessary to improve local deformability for a buffing process.

However, generally, when the strength of a steel sheet is increasing, formability decreases. Therefore, uniform elongation, that is important for drawing or stretching, decreases. In contrast, Non-Patent Document 1 discloses a method of securing the uniform elongation by making austenite remain in a steel sheet.

Furthermore, Non-Patent Document 1 also discloses a method of controlling a metallographic structure of the steel sheet to improve local ductility that is necessary for a bending, a hole expanding process, or a burring process. In addition, Non-Patent Document 2 discloses that reduction of a difference in hardness between microstructures by controlling inclusions so as to control the microstructures into a single structure is effective for bendability or the hole expanding process.

For coexistence between ductility and strength, Non-Patent Document 3 discloses a technology of obtaining an appropriate fraction of ferrite and bainite. In the technology, a metallographic structure control is performed by a cooling control after hot rolling, precipitates and a transformation structure are to be controlled. However, all of the methods are improving methods of local deformability depending on the structure control (a categorical microstructure control), and thus local deformability is greatly affected by a base structure.

On the other hand, Non-Patent Document 4 discloses a technology of improving a material quality of a hot-rolled steel sheet by increasing a rolling reduction amount in a continuous hot rolling process. This technology is a so-called grain refinement technology. In Non-Patent Document 4, large rolling reduction is performed at a very low temperature in an austenite region to transform non-recrystallized austenite into ferrite. According to this, the grains of ferrite that is a main phase of a product is refined, and thus strength and toughness are increased. However, in the production method disclosed in Non-Patent Document 4, an improvement of local deformability and ductility is not considered.

As described above, for improving local deformability of the high-strength steel sheet, the structure control including inclusions is mainly performed.

In addition, in order to use the high-strength steel sheet as members for vehicles, the balance of strength and ductility is needed. For this requirement, hitherto, a TRIP steel sheet, in which transformation induced plasticity of retained austenite is used, is suggested (for example, refer to Patent Document 1 and Patent Document 2).

However, the TRIP steel has characteristics in which strength and ductility are excellent, but generally, local deformability such as hole expansibility is low. Therefore, it is necessary for local deformability such as hole expansibility to be improved so as to use the TRIP steel, for example, as a high-strength steel sheet of underbody components.

CITATION LIST

Patent Literature

[Patent Document 1] Japanese Unexamined Patent Application, First Publication No. S61-217529
[Patent Document 2] Japanese Unexamined Patent Application, First Publication No. H5-59429

Non-Patent Literature

[Non-Patent Document 1] Takahashi et al., Nippon Steel Technical Report (2003) No. 378, P. 7
[Non-Patent Document 2] Kato et al., Iron-Making research (1984) vol. 312, P. 41
[Non-Patent Document 3] K. Sugimoto et al., ISIJ International (2000) Vol. 40, p. 920
[Non-Patent Document 4] NFG product introduction of NAKAYAMA STEEL WORKS, LTD.; http://www.nakayama-steel.co.jp/menu/product/nfg.html

SUMMARY OF INVENTION

Problem to be Solved by the Invention

The present invention is an object to provide a high-strength hot-rolled steel sheet of TRIP steel, which is excellent in local deformability, in which azimuthal dependence of formability is small, and which is excellent in ductility in TRIP steel, and a production method thereof. In addition, the present invention is an object to provide a production method of a high-strength hot-rolled steel sheet in which anisotropy of the hot-rolled steel sheet is improved by controlling a texture through hot rolling.

Means for Solving the Problems

The present inventors have found that in the TRIP steel, when a pole density of a predetermined crystal orientation is appropriately controlled, local deformability is improved. In addition, the present inventors have succeeded in producing a steel sheet which is excellent in local deformability and other mechanical properties by optimizing chemical components and production conditions of the TRIP steel so as to control a microstructure of the steel sheet.

The essence of the present invention is as follows.

(1) According to an aspect of the present invention, there is provided a hot-rolled steel sheet being a steel sheet having a chemical composition, by mass %, of C: 0.02% to 0.5%, Si: 0.001% to 4.0%, Mn: 0.001% to 4.0%, Al: 0.001% to 4.0%, P: 0.15% or less, S: 0.03% or less, N: 0.01% or less, O: 0.01% or less, and the balance consisting of Fe and unavoidable impurities, in which a sum of a content of the Si and a content of the Al is 1.0% to 4.0% in the chemical composition of the steel sheet, an average pole density of an orientation group from {100}<011> to {223}<110>, which is a pole density expressed by an aritc average of pole densities of respective crystal orientations {100}<011>, {116}<110>, {114}<110>, {112}<110>, and {223}<110>, is 1.0 to 6.5, and a pole density of a crystal orientation {332}<113> is 1.0 to 5.0 in a sheet-thickness central portion within a range of ⅝ to ⅜ of a sheet thickness, a microstructure of the steel sheet includes a plurality of grains, the microstructure of the steel sheet includes, by an area ratio, 2% to 30% of retained austenite, 20% to 50% of ferrite, 10% to 60% of bainite, 20% or less of pearlite, and 20% or less of martensite, and rC that is a Lankford value in a direction orthogonal to a rolling direction is 0.70 to 1.10, and r30 that is a Lankford value in a direction forming an angle of 30° with the rolling direction is 0.70 to 1.10.

(2) In the hot-rolled steel sheet according to (1), in which the chemical composition of the steel sheet may further includes, by mass %, one or more selected from the group consisting of Ti: 0.001% to 0.2%, Nb: 0.001% to 0.2%, V: 0.001% to 1.0%, W: 0.001% to 1.0%, Cu: 0.001% to 2.0%, B: 0.0001% to 0.005%, Mo: 0.001% to 1.0%, Cr: 0.001% to 2.0%, As: 0.0001% to 0.50%, Mg: 0.0001% to 0.010%, REM: 0.0001% to 0.1%, Ca: 0.0001% to 0.010%, Ni: 0.001% to 2.0%, Co: 0.0001% to 1.0%, Sn: 0.0001% to 0.2%, and Zr: 0.0001% to 0.2%.

(3) In the hot-rolled steel sheet according to (1) or (2), a volume average diameter of the grains may be 1 μm to 4 μm.

(4) In the hot-rolled steel sheet according to (1) or (2), the average pole density of the orientation group from {100}<011> to {223}<110> may be 1.0 to 5.0, and the pole density of the crystal orientation {332}<113> may be 1.0 to 4.0.

(5) In the hot-rolled steel sheet according to any one of (1) to (4), among the plurality of grains, an area ratio of grains which exceed 20 μm may be limited to 10% or less.

(6) In the hot-rolled steel sheet according to any one of (1) to (5), with regard to at least 100 grains of the retained austenite and the martensite, a standard deviation of a distance $L_{MA}$ between the grains closest to each other may be 5 μm or less.

(7) According to the hot-rolled steel sheet related to the aspect of the present invention, there is provided a production method of the hot-rolled steel sheet, the production method may have: a first hot-rolling process of performing a hot-rolling with respect to a steel, so as to set an average austenite grain size of the steel to 200 μm or less, the first hot-rolling process includes, in which a pass is performed, at least one or more times, with a rolling reduction ratio of 40% or more, in a temperature range of 1,000° C. to 1,200° C., the steel includes a chemical composition which includes, by mass %, C: 0.02% to 0.5%, Si: 0.001% to 4.0%, Mn: 0.001% to 4.0%, Al: 0.001% to 4.0%, P: 0.15% or less, S: 0.03% or less, N: 0.01% or less, O: 0.01% or less, and the balance consisting of Fe and unavoidable impurities, and a sum of a content of the Si and a content of the Al is 1.0% to 4.0%, a second hot rolling process of performing the hot-rolling with respect to the steel, the second hot-rolling process includes, in which large-rolling-reduction passes with a rolling reduction ratio of 30% or more in a temperature range of T1+30° C. to T1+200° C. when a temperature calculated by the following Expression 1 is set to T1° C., an accumulative rolling reduction ratio in a temperature range of T1+30° C. to T1+200° C. is 50% or more, an accumulative rolling reduction ratio in a temperature range, that is higher than or equal to $Ar_3°$ C. and lower than T1+30° C., is limited to 30% or less, and a rolling terminal temperature is $Ar_3°$ C. or higher; a primary cooling process of performing a cooling with respect to the steel, in which a standby time t (second), which is set as a time from a completion of the final pass among the large-rolling-reduction passes to a cooling start, satisfies the following Expression 2; a secondary cooling process of performing a cooling with respect to the steel, in which the steel is cooled to a temperature T3 within a range of 630° C. to 800° C. at an average cooling rate of 10° C./s to 100° C./s; a retention process of performing a retaining, in which the steel is retained within the temperature range of 630° C. to 800° C. for 1 second to 20 seconds, or a slow cooling process of a slow cooling with respect to the steel, in which the steel is slowly cooled from the temperature T3 to a temperature range within lower than T3 and higher than or equal to 550° C. at an average cooling rate of 20° C./s or less; a winding process of performing a winding of the steel in a temperature range of 350° C. to 500° C.; and an air cooling process of performing a cooling of the steel with air, in which the steel, which is retained at a temperature range of 350° C. to 500° C. for 30 minutes to 300 minutes, is then cooled by the air. Herein, $$T1 = 850 + 10 \times ([C]+[N]) \times [Mn] \quad \text{(Expression 1)}$$

Here, [C], [N], and [Mn] represent mass percentages of the content of C, the content of N, and the content of Mn in the steel, respectively.

$$t \leq 2.5 \times t1 \quad \text{(Expression 2)}$$

Here, t1 is expressed by the following Expression 3.

$$t1 = 0.001 \times ((Tf-T1) \times P1/100)^2 - 0.109 \times ((Tf-T1) \times P1/100) + 3.1 \quad \text{(Expression 3)}$$

Here, Tf represents a celsius temperature of the steel at the time of completion of the final pass, and P1 represents a percentage of the rolling reduction ratio during the final pass.

(8) In the production method of the hot-rolled steel sheet according to (7), the production method may have, in which the steel may include the chemical composition which further may include, by mass %, one or more selected from the group consisting of Ti: 0.001% to 0.2%, Nb: 0.001% to 0.2%, V: 0.001% to 1.0%, W: 0.001% to 1.0%, Cu: 0.001% to 2.0%, B: 0.0001% to 0.005%, Mo: 0.001% to 1.0%, Cr: 0.001% to 2.0%, As: 0.0001% to 0.50%, Mg: 0.0001% to 0.010%, REM: 0.0001% to 0.1%, Ca: 0.0001% to 0.010%, Ni: 0.001% to 2.0%, Co: 0.0001% to 1.0%, Sn: 0.0001% to 0.2%, and Zr: 0.0001% to 0.2%, and in which a temperature calculated by the following Expression 4 in place of the temperature calculated by the Expression 1 may be set as T1.

$$T1 = 850 + 10 \times ([C]+[N]) \times [Mn] + 350 \times [Nb] + 250 \times [Ti] + 40 \times [B] + 10 \times [Cr] + 100 \times [Mo] + 100 \times [V] \quad \text{(Expression 4)}$$

Here, [C], [N], [Mn], [Nb], [Ti], [B], [Cr], [Mo], and [V] represent mass percentages of the content of C, the content of N, the content of Mn, the content of Nb, the content of Ti, the content of B, the content of Cr, the content of Mo, and the content of V in the steel, respectively.

(9) In the production method of the hot-rolled steel sheet according to (7) or (8), in which the standby time t (second) may further satisfy the following Expression 5 using t1.

$$t < t1 \quad \text{(Expression 5)}$$

(10) In the production method of the hot-rolled steel sheet according to (7) or (8), in which the standby time t (second) may further satisfy the following Expression 6 using t1.

$$t1 \leq t \leq t1 \times 2.5 \quad \text{(Expression 6)}$$

(11) In the production method of the hot-rolled steel sheet according to any one of (7) to (10), in the primary cooling process, the average cooling rate may be 50° C./s or more, a cooling temperature variation that is a difference between a steel temperature at the start time of cooling and a steel temperature at the finish time of cooling may be 40° C. to 140° C., and the steel temperature at the finish time of the cooling may be T1+100° C. or lower.

(12) In the production method of the hot-rolled steel sheet according to any one of (7) to (11), wherein the final pass of rolling within a temperature range of T1+30° C. to T1+200° C. may be the large-rolling-reduction pass.

(13) In the production method of the hot-rolled steel sheet according to any one of (7) to (12), wherein in the temperature range control, a temperature variation rate may be −40° C./h to 40° C./h.

(14) In the production method of the hot-rolled steel sheet according to any one of (7) to (13), wherein the primary cooling process may be performed between rolling stands.

Effects of the Invention

According to the aspects of the present invention, it is possible to provide a high-strength hot-rolled steel sheet which is excellent in local deformability such as bendability, stretch flangeability, burring workability, and hole expansibility, and in which azimuthal dependence of formability is small, and which is excellent in ductility, and a production method thereof. When the steel sheet is used, particularly, weight saving of vehicles and collision safety of vehicles may be compatible with each other, and thus industrial contribution is significant.

DESCRIPTION OF EMBODIMENTS

Figure 1:
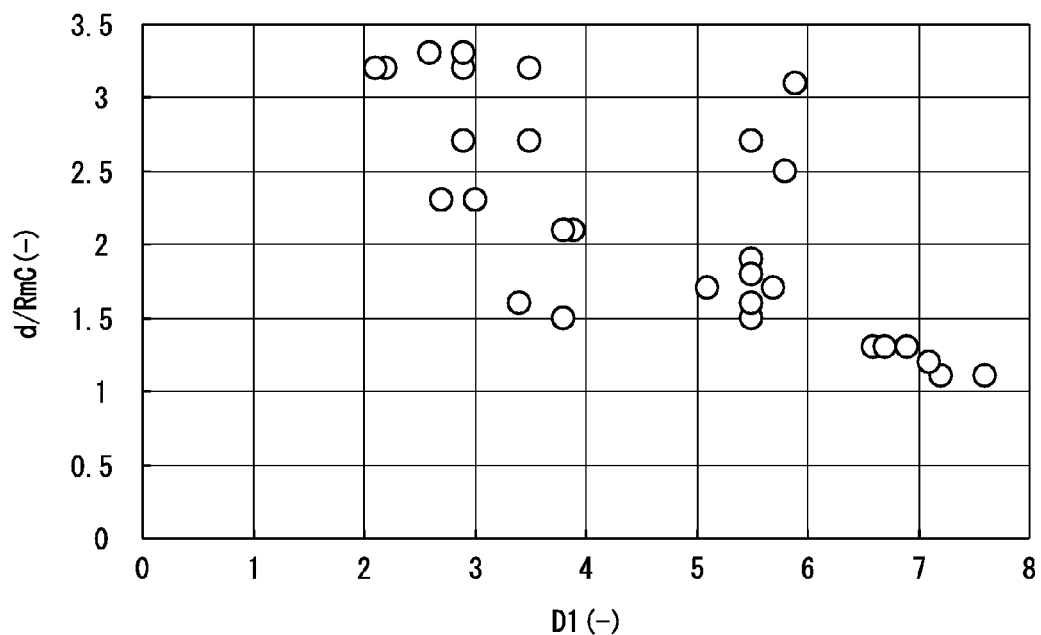
FIG. 1 is a diagram illustrating a relationship between an average pole density of an orientation group from {100}<011> to {223}<110> and d/RmC (sheet thickness d/minimum bend radius RmC).

As described above, according to the finding in the related art, hole expansibility, bendability, and the like are improved by an inclusion control, precipitates refinement, homogenization of a microstructure, a single phase structure control, and a reduction in hardness difference between microstructures, and the like. However, with only these technologies, there is no choice but to limit a main structure configuration. Furthermore, for high strength, when representative elements such as Nb and Ti that is largely contribute to an increase in strength are added, anisotropy largely increases. Therefore, there is a problem in that another formability factor may be sacrificed, or a direction of punching blanks before formation is limited. Therefore, a usage of the steel sheet is limited.

In the TRIP steel sheet which is one of technologies to increase ductility, during an annealing process, by means of concentration of C in austenite, and thus an amount of retained austenite or the amount of C in the retained austenite increases. Accordingly, tensile strength is improved.

Therefore, concerning with the TRIP steel sheet, the present inventors have made an examination and a research about grain refinement of a microstructure and a texture control in a hot rolling process so as to improve bending workability and hole expansibility. As a result, they have made clear that local deformability of the TRIP steel sheet may be sufficiently improved, by controlling the pole density of crystal orientation, to be described later. In addition, the present inventors have made clear that particularly local deformability of the TRIP steel sheet is dramatically improved, in a case where rC that is a Lankford value (r value) in a direction orthogonal to a rolling direction, and r30 that is a Lankford value (r value) in a direction forming an angle of 30° with the rolling direction are in balance with each other.

Hereinafter, the hot-rolled steel sheet related to an embodiment of the present invention will be described in detail.

First, the pole density of the crystal orientation of the hot-rolled steel sheet will be described.

Pole Density (D1 and D2) of Crystal Orientation:

In the hot-rolled steel sheet related to the embodiment, as pole densities of two kinds of crystal orientations, with respect to a sheet-thickness cross-section, which is parallel with a rolling direction, at a sheet-thickness central portion within a range of ⅝ to ⅜ of the sheet thickness (that is a range distant from a surface of the steel sheet by a distance of a range of ⅝ to ⅜ of the sheet thickness in a sheet-thickness direction (depth direction) of the steel sheet), an average pole density D1 of an orientation group from {100}<011> to {223}<110> (hereinafter, may be abbreviated as an average pole density), and a pole density D2 of a crystal orientation {332}<113> are controlled.

In the embodiment, the average pole density is a characteristic (an orientation integration degree, a development degree of a texture) of a particularly important texture (a crystal orientation of a grain in a microstructure). In addition, the average pole density is a pole density expressed by an arithmetic average of pole densities of respective crystal orientations {100}<011>, {116}<110>, {114}<110>, {112}<110>, and {223}<110>.

With respect to a cross-section at a sheet-thickness central portion within a range of ⅝ to ⅜ of a sheet thickness, Electron Back Scattering Diffraction (EBSD) or X-ray diffraction is performed to obtain intensity ratios of electron diffraction intensity or X-ray diffraction intensity of respective orientations for a random sample, and the average pole density of an orientation group from {100}<011> to {223}<110> may be obtained from the respective intensity ratios.

When the average pole density of the orientation group from {100}<011> to {223}<110> is 6.5 or less, d/RmC (an index obtained by dividing a sheet-thickness d by minimum bend radius RmC (C-direction bending)), which is necessary for processing of underbody components or skeleton components, may satisfy 1.5 or more. This condition is one condition for satisfying the following two conditions, particularly, one is between tensile strength TS and hole expansion ratio 2, and another is between tensile strength TS and elongation EL, which are necessary for underbody members, that is, TS×λ≥30,000 and TS×EL≥14,000. Furthermore, when the average pole density is 5.0 or less, a ratio (Rm45/RmC) of minimum bend radius Rm45 of 45°-direction bending to minimum bend radius RmC of C-direction bending, which is an index of azimuthal dependence (isotropy) of formability, decreases, and thus high local deformability that does not depend on a bending direction may be secured. Accordingly, the average pole density may be 6.5 or less, and preferably 5.0 or less. In a case where further excellent hole expansibility or further smaller bending limit characteristic is necessary, the average pole density is more preferably less than 4.0, and still more preferably less than 3.0.

When the average pole density of the orientation group from {100}<011> to {223}<110> exceeds 6.5, anisotropy of mechanical properties of the steel sheet significantly increases. As a result, local deformability only in a specific direction is improved, but local deformability in other directions different from the direction significantly deteriorates. Therefore, in this case, the steel sheet may not satisfy d/RmC≥1.5 as shown in FIG. 1.

On the other hand, when the average pole density is less than 1.0, there is a concern that local deformability deteriorates. Therefore, it is preferable that the average pole density is 1.0 or more.

Furthermore, from the same reason, the pole density of the crystal orientation {332}<113> at the sheet-thickness central portion within a range of ⅝ to ⅜ of the sheet thickness is set to 5.0 or less. This condition is one condition in which the steel sheet satisfies d/RmC≥1.5. Particularly, the condition is one condition for satisfying the following two conditions between tensile strength TS and hole expansion ratio λ, and tensile strength TS and elongation EL, which are necessary for underbody members, that is, both TS×λ≥30,000 and TS×EL≥14,000.

Figure 2:
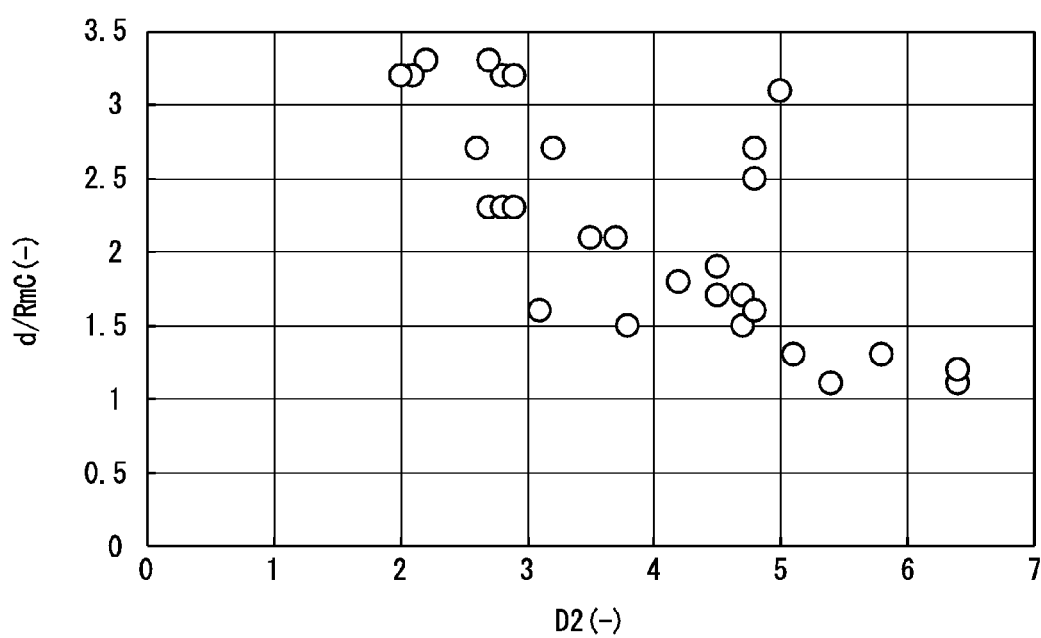
FIG. 2 is a diagram illustrating a relationship between a pole density of an orientation {332}<113> and d/RmC.

Furthermore, when the pole density is 4.0 or less, TS×λ or d/RmC may be further increased. Accordingly, it is preferable that the pole density is 4.0 or less, and more preferably 3.0 or less. When the pole density exceeds 5.0, anisotropy of mechanical properties of the steel sheet significantly increases. As a result, local deformability only in a specific direction is improved, but local deformability in other directions different from the direction significantly deteriorates. Therefore, in this case, the steel sheet may not reliably satisfy d/RmC 1.5 as shown in FIG. 2.

On the other hand, when the pole density is less than 1.0, there is a concern that local deformability deteriorates. Therefore, it is preferable that the pole density of the crystal orientation {332}<113> is 1.0 or more.

The pole density has the same meaning as an X-ray random intensity ratio. The X-ray random intensity ratio is a numerical value obtained by dividing diffraction intensity of a sample material by diffraction intensity of a standard sample not having integration in a specific orientation. The diffraction intensity (X-ray or electron) of the standard sample, and the diffraction intensity of the sample material may be obtained by measurement using an X-ray diffraction method and the like under the same conditions. The pole density may be measured using X-ray diffraction, Electron Back Scattering Diffraction (EBSD), or electron channeling. For example, the pole density of the orientation group from {100}<011> to {223}<110> may be obtained as follows. The pole densities of respective orientations {100}<011>, {116}<110>, {114}<110>, {112}<110>, and {223}<110> are obtained from a three-dimensional texture (ODF) calculated by a series-expanding method using a plurality of pole figures among the pole figures {110}, {100}, {211}, and {310} measured by the methods, and these pole densities are arithmetically averaged to obtain the pole density of the orientation group {100}<011> to {223}<110>.

With respect to the sample that is provided for the X-ray diffraction, the EBSD, and the electron channeling, the thickness of the steel sheet may be reduced by mechanical polishing or the like to a predetermined sheet thickness. Next, at the same time to may remove a strain by chemical polishing, electrolysis polishing, or the like, the sample may be adjusted in order for an appropriate surface including a range of ⅝ to ⅜ of the sheet thickness to be a measurement surface. And the pole density may be measured according to the above-described methods. With regard to a sheet width direction, it is preferable that the sample is collected in the vicinity of ¼ or ¾ of a sheet-thickness position (a position is distant from an end surface of the steel sheet by a distance that is ¼ of a sheet-width of the steel sheet).

With regard to not only the sheet-thickness central portion but also as many as possible sheet-thickness positions, when the steel sheet satisfies the above-described pole density, local deformability is further improved. However, the orientation integration of the above-described sheet-thickness central portion is the strongest, and an effect on the anisotropy of the steel sheet is large, and thus the material quality of the sheet-thickness central portion is generally representative of material properties of the entirety of the steel sheet. Accordingly, the average pole density of the orientation group from {100}<011> to {223}<110> and the pole density of the crystal orientation {332}<113> in a range of ⅝ to ⅜ of the sheet thickness central portion are specified.

Figure 3:
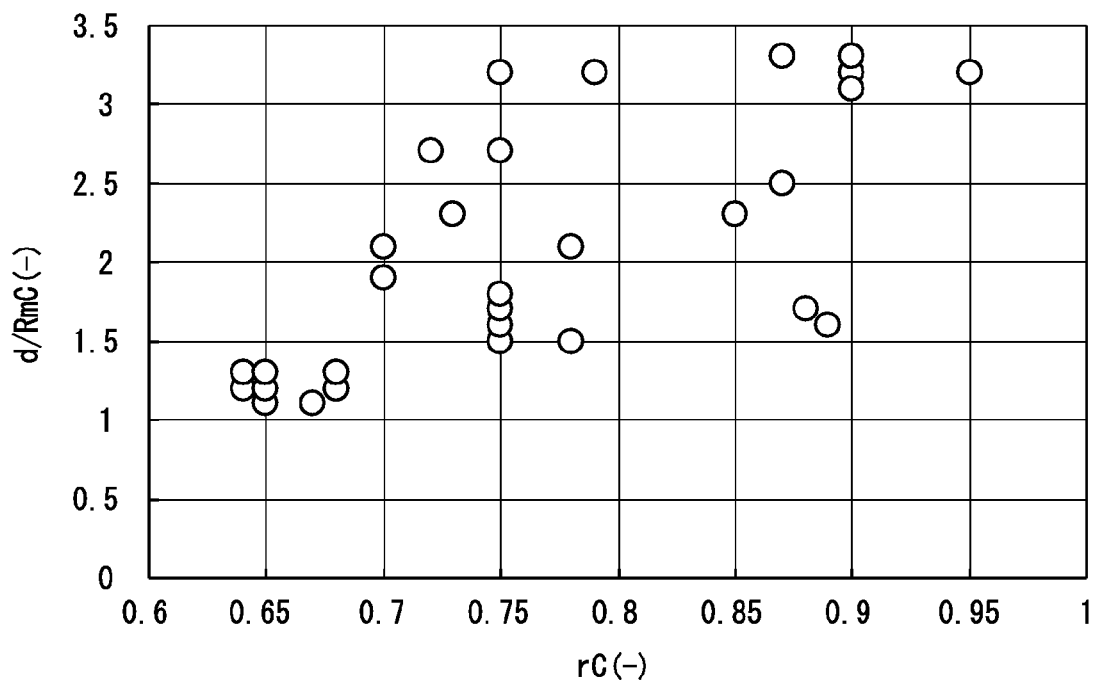
FIG. 3 is a diagram illustrating a relationship between an r value (rC) in a direction orthogonal to a rolling direction and d/RmC.

Here, {hkl}<uvw> represents that when the sample is collected by the above-described method, a normal direction of a sheet surface is parallel with <hkl>, and a rolling direction is parallel with <uvw>. In addition, with regard to a crystal orientation, an orientation that is commonly orthogonal to the sheet surface is expressed by (hkl) or {hkl}, and an orientation that is parallel with the rolling direction is expressed by [uvw] or <uvw>. {hkl}<uvw> collectively represents equivalent planes, and (hkl)[uvw] represents individual crystal plane. That is, in the embodiment, since a body centered cubic structure (bcc structure) is a target, for example, respective planes (111), (−111), (1-11), (11-1), (−1-11), (−11-1), (1-1-1), and (−1-1-1) are equivalent, and thus are not distinguishable. In this case, these orientations are collectively called a plane {111}. The ODF expression is also used for orientation expression of other crystal structures having a low symmetric property, and thus in the ODF expression, an individual orientation is generally expressed by (hkl)[uvw]. However, in the embodiment, {hkl}<uvw> and (hkl)[uvw] have the same meaning.

r Value (rC) in Direction Orthogonal to Rolling Direction:

The r value (Lankford value) of the steel sheet is important in the embodiment. That is, as a result of the intensive investigation by the present inventors, as shown in FIG. 3, the present inventors have found that when the respective pole densities, which are described above, are set within the above-described ranges, at the same time, and rC is set to 0.70 or more, good hole expansibility and good bendability may be obtained. Accordingly, rC may be 0.70 or more.

Figure 4:
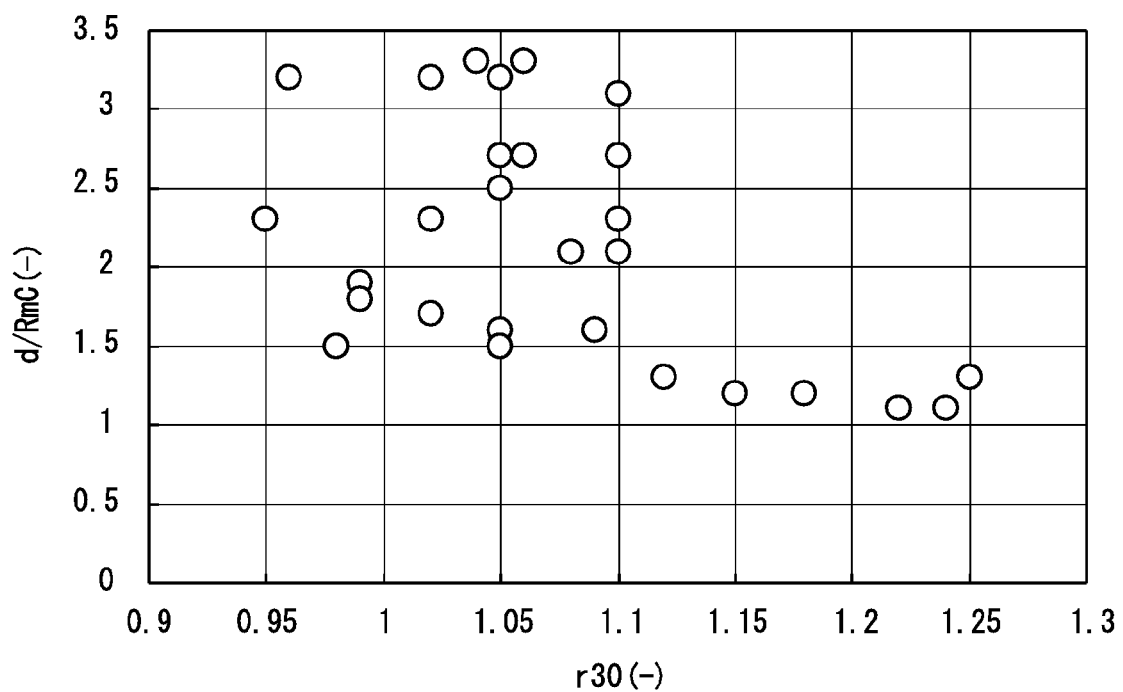
FIG. 4 is a diagram illustrating a relationship between an r value (r30) in a direction forming an angle of 30° with the rolling direction and d/RmC.

The upper limit of rC may be 1.10 or less to obtain further excellent hole expansibility and bendability.

r Value (r30) in Direction Having Angle of 30° with Rolling Direction:

The r value (Lankford value) of the steel sheet is important in the present invention. That is, as a result of the intensive investigation by the present inventors, as shown in FIG. 4, the present inventors have found that when the respective pole densities, which are described above, are set within the above-described ranges, at the same time, and r30 is set to 1.10 or less, good hole expansibility and good bendability may be obtained. Accordingly, r30 may be 1.10 or less.

The lower limit of r30 may be 1.10 to obtain further excellent hole expansibility and bendability.

The above-described r value is evaluated by a tensile test using a tensile test specimen of JIS No. 5. In consideration of a common high-strength steel sheet, the r value may be evaluated within a range in which tensile strain is within a range of 5% to 15% and within a range in which corresponds to uniform elongation.

However, generally, it is known that the texture and the r value have a correlation with each other, but in the hot-rolled steel sheet related to the embodiment, as already mentioned, the limitation for the pole density of the crystal orientation and the limitation for the r value are different from each other. Therefore, when both of the limitations are satisfied concurrently, good local deformability may be obtained.

Next, a microstructure of the hot-rolled steel sheet related to the embodiment will be described.

A basic microstructure of the hot-rolled steel sheet related to the embodiment includes ferrite, bainite, and retained austenite. In the embodiment, in addition to the basic components of the microstructure (in place of a part of ferrite, bainite, and retained austenite), one or more kinds of pearlite and martensite (including tempered martensite) may be included in the microstructure as a selective component of the microstructure as necessary or in an unavoidable manner. In addition, in the embodiment, an individual microstructure is evaluated by an area ratio.

Ferrite and bainite concentrate C in the retained austenite, and thus ferrite and bainite are necessary for improvement of ductility by the TRIP effect. Furthermore, ferrite and bainite also contribute to improvement of hole expansibility. The fraction of ferrite and the fraction of bainite may be allowed to vary depending on a strength level that is an aim of development, when ferrite is set to from 20% to 50% and bainite is set to from 10% to 60%, excellent ductility and excellent hole expansibility are capable of being obtained. Accordingly, ferrite is set to from 20% to 50%, and bainite is set to from 10% to 60%.

The retained austenite is a structure that increases ductility, particularly, uniform elongation by transformation induced plasticity, and it is necessary for the retained austenite to be 2% or more in terms of an area ratio. In addition, the retained austenite is transformed to martensite by processing, and also contributes to improvement of strength. The higher the area ratio of the retained austenite is, the more preferable. However, it is necessary to increase the content of C and Si so as to secure retained austenite exceeding 30% in terms of an area ratio, and in this case, weldability or surface qualities deteriorate. Therefore, the upper limit of the area ratio of the retained austenite is set to 30% or less. In addition, in a case where it is necessary to further increase the uniform elongation, it is preferable that the retained austenite is 3% or more, more preferably 5% or more, and still more preferably 8% or more.

In addition, the microstructure may contain each of pearlite and martensite (including tempered martensite) in a fraction of 20%. When the amount of pearlite and martensite increases, workability and local deformability of the steel sheet decrease, or a utilization rate of C, that generates retained austenite, decreases. Therefore, in the microstructure, pearlite is limited to 20% or less, and martensite is limited to 20% or less.

Here, the area ratio of austenite may be determined from diffraction intensity that may be obtained by performing X-ray diffraction with respect to a plane, which is parallel with a sheet surface, in the vicinity of ¼ sheet-thickness position.

In addition, the area ratio of ferrite, pearlite, bainite, and martensite may be determined from an image that may be obtained by observing ⅛ to ⅜ of sheet-thickness range (that is, a sheet-thickness range in which ¼ sheet-thickness position becomes the center) using a Field Emission Scanning Electron Microscope (FE-SEM). In the FE-SEM observation, a sample is collected in such a manner that a sheet-thickness cross-section which is parallel with the rolling direction of the steel sheet becomes an observation surface, and polishing and Nital etching are performed with respect to the observation surface.

In addition, with regard to the sheet-thickness direction, in the vicinity of the surface of the steel sheet and in the vicinity of the center of the steel sheet, the microstructure (component) of the steel sheet may be largely different from other portions due to decarburization and Mn segregation. Therefore, in the embodiment, the observation of the microstructure is performed at the ¼ of sheet-thickness position, which is the reference.

Furthermore, in a case of further improving the elongation, the size of the grain in the microstructure, particularly, a volume average diameter may be made fine. Furthermore, by making refinement of the volume average diameter, and thus fatigue properties (fatigue limit ratio) that are necessary for steel sheets for vehicles are improved.

The number of coarse grains has a high influence rate on the elongation compared to fine grains, and thus the elongation has a close correlation with a volume-average diameter calculated as a weighted average of the volume compared to a number-average diameter. Therefore, in a case of obtaining the above-described effect, the volume-average diameter may be from 1 μm to 15 μm, preferably from 1 μm to 9.5 μm, and more preferably from 1 μm to 4 μm.

In addition, when the volume-average diameter decreases, local strain concentration that occurs in a micrometer order is suppressed, and thus strain during local deformation may be dispersed. Accordingly, it is considered that elongation, particularly, uniform elongation is improved. In addition, when the volume-average diameter decreases, a grain boundary, which is serving as a barrier of dislocation motion, may be appropriately controlled. In addition, the grain boundary acts on repetitive plastic deformation (fatigue phenomenon) that occurs due to the dislocation motion, and thus fatigue properties are improved.

In addition, the diameter of an individual grain (grain unit) may be determined as follows.

Pearlite is specified by structure observation using an optical microscope. In addition, the grain units of ferrite, austenite, bainite, and martensite are specified by EBSD. When a crystal structure of a region which is determined by the EBSD is a face-centered cubic structure (fcc structure), this region is determined as austenite. In addition, when a crystal structure of a region which is determined by the EBSD is a body-centered cubic structure (bcc structure), this region is determined as any one of ferrite, bainite, and martensite. Ferrite, bainite, and martensite may be distinguished using a Kernel Average Misorientation (KAM) method that is equipped to EBSP-OIM® (Electron Back Scatter Diffraction Pattern-Orientation Image Microscopy). In the KAM method, a difference in orientation between respective pixels is averaged in a first approximation (total seven pixels) in which an arbitrary regular hexagonal pixel (central pixel) among measurement data and six pixels that are adjacent to the pixel are used, in a second approximation (total 19 pixels) in which 12 pixels positioned further outside the six pixels are also used, or in a third approximation (total 37 pixels) in which 18 pixels positioned further outside the 12 pixels are also used. Then, an average value that is obtained is determined as a value of the central pixel, and this operation is performed with respect to the entirety of the pixels. When the calculation according to the KAM method is performed without exceeding a grain boundary, a map, which is expressing an intragranular orientation variation, may be created. This map shows a strain distribution based on the intragranular local orientation variation.

In the embodiment, the orientation difference between adjacent pixels is calculated by the third approximation in the EBSP-OIM (registered trademark). The grain size of ferrite, bainite, martensite, and austenite may be obtained as follows. For example, the above-described orientation measurement is performed at a measurement step of 0.5 μm below with a magnification of 1,500 times, a position at which the orientation difference between measurement points, which are adjacent to each other, exceeds 15° is determined as a grain boundary (this grain boundary, necessarily, may not be a general grain boundary), and an equivalent circle diameter is calculated to obtain the grain size. In a case where pearlite is contained in the microstructure, with respect to an image obtained by an optical microscope, the pearlite grain size may be calculated by applying an image processing method such as binarization processing and an intercept method.

In the grain (grain unit) defined as described above, in a case where an equivalent circle radius (a half value of the equivalent circle diameter) is set to r, the volume of an individual grain may be obtained by $4 \times \pi \times r^3/3$, and a volume average diameter may be obtained by a weighted average of the volume.

In addition, an area ratio of a following coarse grain may be obtained by dividing the area ratio of the coarse grain, which is obtained by the method, by an area of an object to be measured.

Furthermore, the following distance $L_{MA}$ may be determined using a boundary between austenite and a grain other than austenite and a boundary between martensite and a grain other than martensite which are obtained by the above method (only, FE-SEM with which EBSD is possible).

Furthermore, in a case of further improving bendability, with respect to total components of the microstructure, a ratio of an area (area ratio of a coarse grain) that is occupied by a grain (coarse grain) having a grain size, which is exceeding 20 μm per a unit area, may be limited to 10% or less. When a grain having a large grain size increases, tensile strength decreases, and thus local deformability also decreases. Therefore, it is preferable to make the grain as fine as possible. Furthermore, when all grains are uniformly and equivalently received a strain, bendability is improved. Accordingly, local strain of the grain may be suppressed by limiting the amount of coarse grains.

In addition, to further improve local deformability such as bendability, stretch flangeability, burring workability, and hole expansibility, it is preferable that a hard structure such as retained austenite and martensite is dispersed. Therefore, among grains of retained austenite and martensite, the standard deviation of a distance $L_{MA}$ [μm] between closest crystal grains (retained austenite or martensite) with each other may be set to 5 μm. In this case, with respect to at least 100 grains of retained austenite and martensite, the standard deviation of the distance $L_{MA}$ may be obtained by measuring the distance $L_{MA}$.

Next, the reason why the chemical components (chemical elements) of the hot-rolled steel sheet related to the embodiment are limited will be described. Here, "%" in the content of respective chemical components represents "by mass %".

C: 0.02% to 0.5%

C is necessary to secure high strength and retained austenite. It is necessary for the content of C to be 0.02% or more so as to obtain a sufficient amount of retained austenite. On the other hand, when the steel sheet excessively contains C, weldability deteriorates, and thus the upper limit of the content of C is set to 0.5% or less. In a case of further improving strength and elongation, it is preferable that the content of C is 0.05% or more, more preferably 0.06% or more, and still more preferably 0.08% or more. In addition, in a case of further improving weldability, it is preferable that the content of C is 0.45% or less, and more preferably 0.40% or less.

Si: 0.001% to 4.0%

Si is a deoxidizer, and it is preferable that a steel contains 0.001% or more of Si. In addition, Si stabilizes ferrite during a temperature control after hot rolling, and suppresses cementite precipitation after winding (during bainitic transformation). Accordingly, Si increases the concentration of C in austenite, and contributes to securement of retained austenite. The more the content of Si is, the further the effect increases. However, when Si is excessively added to the steel, surface qualities, paintability, weldability, and the like deteriorate. Therefore, the upper limit of the content of Si is set to 4.0% or less. In a case that an effect of obtaining stable retained austenite is sufficiently exhibited by Si, it is preferable that the content of Si is 0.02% or more, more preferably 0.20% or more, and still more preferably 0.50% or more. In addition, in a case of further securing the surface qualities, paintability, weldability, and the like, it is preferable that the content of Si is 3.5% or less, and more preferably 3.0% or less.

Mn: 0.001% to 4.0%

Mn is an element that stabilizes austenite, and increase hardenability. It is necessary for steel to contain 0.001% or more of Mn so as to secure sufficient hardenability. On the other hand, when Mn is excessively added in the steel, ductility deteriorates, and thus the upper limit of the content of Mn is set to 4.0%. To secure further higher hardenability, it is preferable that the content of Mn is 0.1% or more, more preferably 0.5% or more, and still more preferably 1.0% or more. In addition, in a case of securing further higher ductility, it is preferable that the content of Mn is 3.8% or less, and more preferably 3.5% or less.

P: 0.15% or less

P is an impurity, and when P is excessively contained in steel, ductility or weldability deteriorates. Therefore, the upper limit of the content of P is set to 0.15% or less. In addition, P operates as a solid-solution hardening element, but P is unavoidably contained in steel. Accordingly, it is not necessary to particularly limit the lower limit of the content of P, and the lower limit is 0%. In addition, when considering recent general refining (including secondary refining), the lower limit of the content of P may be 0.001%. In a case of further increasing ductility and weldability, it is preferable that the content of P is 0.12% or less, and more preferably 0.10% or less.

S: 0.03% or less

S is an impurity, and when S is excessively contained in steel, MnS that elongates by hot rolling is generated. Therefore, formability such as ductility and hole expansibility deteriorates. Therefore, the upper limit of the content of S is set to 0.03%. In addition, since S is unavoidably contained in steel, it is not necessary to particularly limit the lower limit of the content of S, and the lower limit is 0%. In addition, when considering recent general refining (including secondary refining), the lower limit of the content of S may be 0.0005%. In a case of further increasing ductility and hole expansibility, it is preferable that the content of S is 0.020% or less, and more preferably 0.015% or less.

O: 0.01% or less

O (oxygen) is an impurity, and when the content of O exceeds 0.01%, ductility deteriorates. Therefore, the upper limit of the content of O is set to 0.01%. In addition, since O is unavoidably contained in steel, it is not necessary to particularly limit the lower limit of the content of O, and the lower limit is 0%. In addition, when considering recent general refining (including secondary refining), the lower limit of the content of O may be 0.0005%.

Al: 0.001% to 4.0%

Al is a deoxidizer, and when considering recent general refining (including secondary refining), it is preferable that 0.001% or more of Al is contained in steel. In addition, Al stabilizes ferrite during a temperature control after hot rolling, and suppresses cementite precipitation during bainitic transformation. Accordingly, Al increases the concentration of C in austenite, and contributes to securement of retained austenite. When the content of Al is increasing, the effect further increases. However, when Al is excessively added to steel, surface qualities, paintability, and weldability deteriorate. Therefore, the upper limit of the content of Al is set to 2.0%. In a case that an effect of obtaining stable retained austenite to be sufficiently exhibited by Al, it is preferable that the content of Al is 0.005% or more, and more preferably 0.01% or more. In addition, in a case where it is necessary to further secure the surface qualities, paintability, weldability, and the like, it is preferable that the content of Al is 3.5% or less, and more preferably 3.0% or less.

N: 0.01% or less

N is an impurity, and when the content of N exceeds 0.01%, ductility deteriorate. Therefore, the upper limit of the content of N is set to 0.01% or less. In addition, since N is unavoidably contained in steel, it is not necessary to particularly limit the lower limit of the content of N, and the lower limit is 0%. In addition, when considering recent general refining (including secondary refining), the lower limit of the content of N may be 0.0005%. In a case of further increasing ductility, it is preferable that the content of N is 0.005% or less.

Si+Al: 1.0% to 4.0%

These elements are deoxidizers as described above. In addition, both Si and Al stabilize ferrite during a temperature control after hot rolling, and suppress cementite precipitation after winding (during bainitic transformation). Accordingly, these elements increase the concentration of C in austenite, and contribute to securement of retained austenite. As a result, it is preferable that the sum of the content of Si and the content of Al is 1.0% or more. However, when these elements are excessively added to steel, surface qualities, paintability, weldability, and the like deteriorate, and thus the sum of the content of Si and the content of Al is set to 4.0% or less. In a case of further securing surface qualities, paintability, weldability, and the like, it is preferable that the sum is 3.5% or less, and more preferably 3.0% or less.

The above-described chemical elements are basic components (basic elements) of steel in the embodiment, and the chemical composition in which the basic elements are controlled (contained or limited), and in which the balance including of Fe and unavoidable impurities is a basic composition of the embodiment. However, in the embodiment, in addition to the basic components (in place of a part of Fe of the balance), the following chemical elements (selective elements) may be further contained in steel as necessary. In addition, even when the selective elements are unavoidably contained (for example, in an amount less than the lower limits of the amounts of the respective selective elements) in steel, the effect in the embodiment does not deteriorate.

That is, the hot-rolled steel sheet related to the embodiment may contain one or more kinds among Ti, Nb, B, Mg, REM, Ca, Mo, Cr, V, W, Ni, Cu, Co, Sn, Zr, and As as a selective element to improve local deformability, for example, by inclusions control or precipitates refinement.

Furthermore, in a case of obtaining strength by precipitation strengthening, fine carbo-nitrides may be allowed to be generated. It is effective to add Ti, Nb, V, W, and Cu so as to obtain the precipitation strengthening. In addition, the steel sheet may contain one or more kinds of these as necessary.

To obtain the effect by addition of Ti, Nb, V, W, and Cu, the content of Ti is preferably 0.001% or more, the content of Nb is preferably 0.001% or more, the content of V is preferably 0.001% or more, the content of W is preferably 0.001% or more, and the content of Cu is preferably 0.001% or more. However, even when the chemical elements are excessively added to steel, an increase in strength is saturated, and in addition to this, recrystallization after hot rolling is suppressed, and thus, it is difficult to control crystal orientation. Therefore, the content of Ti is limited to 0.2% or less, the content of Nb is limited to 0.2% or less, the content of V is limited to 1.0% or less, the content of W is limited to 1.0% or less, and the content of Cu is limited to 2.0% or less. In addition, in consideration of alloy cost reduction, it is not necessary to purposely add these chemical elements to steel, and all of the lower limits of the content of Ti, the content of Nb, the content of V, the content of W, and the content of Cu are 0%.

In a case of increasing hardenability of a structure and performing a secondary phase control to secure strength, it is effective to add one or more kinds among B, Mo, Cr, and As according to necessity. To obtain the effect, the content of B is preferably 0.0001% or more, the content of Mo and the content of Cr are preferably 0.001% or more, and the content of As is preferably 0.0001% or more. However, when these chemical elements are excessively added, workability conversely deteriorates, and thus the upper limit of the content of B is limited to 0.005%, and the upper limit of the content of Mo is limited to 1.0%, and the upper limit of the content of Cr is limited to 2.0%, and the upper limit of the content of As is limited to 0.50%. In addition, for cost reduction of alloy, it is not necessary to purposely add these chemical elements to steel, and all of the lower limits of the content of B, the content of Mo, the content of Cr, and the content of As are 0%.

Mg, REM (Rare Earth Metal), and Ca are important selective elements to improve local deformability of the steel sheet by controlling inclusions into a harmless type. Accordingly, one or more kinds among Mg, REM, and Ca may be added to steel as necessary. In this case, all of the lower limits of the respective chemical elements are preferably 0.0001% or less. On the other hand, when these chemical elements are excessively added to steel, cleanliness deteriorates. Therefore, with regard to the upper limits of the contents of the respective chemical elements, the content of Mg is limited to 0.010% or less, the content of REM is limited to 0.1% or less, and the content of Ca is limited to 0.010% or less. In addition, for cost reduction of alloy, it is not necessary to purposely add these chemical elements to the steel, and all of the lower limits of the content of Mg, the content of REM, and the content of Ca are 0%.

Ni, Co, Sn, and Zr are selective elements to increase strength, and one or more kinds of these chemical elements may be added to steel as necessary. In this case, the content of Ni is preferably 0.001% or more, the content of Co is preferably 0.0001% or more, the content of Sn is preferably 0.0001% or more, and the content of Zr is preferably 0.0001% or more. However, when these chemical elements are excessively added to steel, formability is lost. Therefore, with regard to the upper limits of the respective chemical elements, the content of Ni is limited to 2.0% or less, the content of Co is limited to 1.0% or less, the content of Sn is limited to 0.2% or less, and the content of Zr is limited to 0.2% or less. In addition, for cost reduction of alloy, it is not necessary to purposely add these chemical elements to steel, and all of the lower limits of the content of Ni, the content of Co, the content of Sn, and the content of Zr are 0%.

As described above, the hot-rolled steel sheet related to the embodiment has a chemical composition containing the above-described basic elements, the balance including of Fe and unavoidable impurities, or a chemical composition containing the above-described basic elements and at least one of the above-described selective elements, the balance including Fe and unavoidable impurities.

In addition, the hot-rolled steel sheet related to the embodiment may be subjected to a surface treatment. For example, the hot-rolled steel sheet may include various kinds of film (film or coating) by applying surface treatments such as electro coating, hot-dip coating, deposition coating, an alloying treatment after coating, organic film formation, film laminating, a treatment using organic salts/inorganic salts, and a non-chromium treatment (non-chromate treatment). As an example of these films, the hot-rolled steel sheet may include a hot-dip galvanized layer or a galvanneald layer on a surface thereof. Even when the hot-rolled steel sheet includes the film, local deformability may be sufficiently maintained.

In addition, in this embodiment, the sheet thickness of the hot-rolled steel sheet is not particularly limited, but for example, the sheet thickness may be from 1.5 mm to 10 mm, or from 2.0 mm to 10 mm. In addition, the strength of the hot-rolled steel sheet is also not particularly limited, and for example, the tensile strength may be from 440 MPa to 1,500 MPa.

The hot-rolled steel sheet related to the embodiment is applicable to overall uses of a high-strength steel sheet, and local deformability such as bending workability and hole expansibility of the high-strength steel sheet is significantly improved.

In addition, a direction, which is performed of bending processing, to the hot-rolled steel sheet is different depending on components to be processed, and the direction is not particularly limited. In the hot-rolled steel sheet related to the embodiment, the same properties may be obtained in all bending directions, and thus the hot-rolled steel sheet is applicable to composite forming including processing modes such as bending, stretching, and drawing.

Next, a production method of the hot-rolled steel sheet related to an embodiment of the present invention will be described.

To realize excellent local deformability, it is important to form a texture (non-developed texture) which has a pole density of less anisotropy, and to appropriately control rC and r30. Details of production conditions to control respective pole density, rC, and r30 with respect to the hot-rolled steel sheet that is produced will be described below.

A production method preceding hot rolling is not particularly limited. For example, various kinds of secondary refining may be performed subsequently to smelting and refining using a blast furnace, an electric furnace, a converter, or the like to melt steel which is satisfying the above-described chemical composition, whereby steel (molten steel) may be obtained. Then, to obtain a steel ingot or slab from the steel, for example, the steel may be casted by casting methods such as a common continuous casting method, an ingot method, and a thin slab casting method. In the case of the continuous casting, the steel may be hot-rolled after cooling the steel once to a low temperature (for example, room temperature), and reheating the steel. Alternatively, steel (casted slab) immediately after being casted may be continuously hot-rolled. In addition, as a raw material of steel (molten steel), scrap may be used.

To obtain a high-strength hot-rolled steel sheet that is excellent in local deformability, it is preferable to satisfy the following conditions.

It is preferable that the austenite grain size before finish rolling is small so as to increase local deformability. In addition, it has been proven that when an average austenite grain size before finish rolling is 200 nm or less, this is effective to obtain sufficient local deformability.

Figure 5:
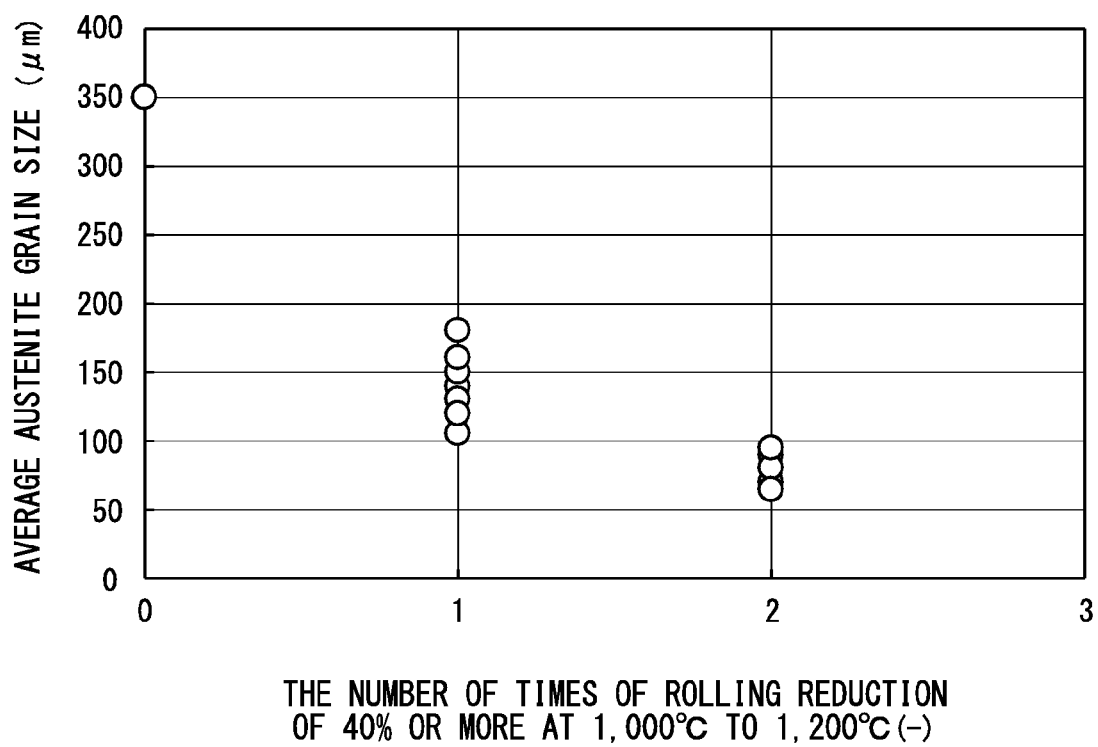
FIG. 5 is a diagram illustrating a relationship between the number of rolling times of 40% or more in rough rolling and an austenite grain size of the rough rolling.

As shown in FIG. 5, to obtain an average austenite grain size of 200 μm or less before finish rolling, steel may be rolled one or more times with a rolling reduction ratio of 40% or more by rough rolling (first hot rolling) within a temperature range of from 1,000° C. to 1,200° C. (preferably, 1,150° C. or lower).

As the rolling reduction ratio and the number of rolling reduction times increase, a further fine austenite grain may be obtained. For example, in the rough rolling, it is preferable to control the average austenite grain size to 100 μm or less. To perform a grain size control, rolling in which a rolling reduction ratio of one pass is 40% or more may be performed two or more times (two or more passes). However, with regard to the rough rolling, when the rolling reduction ratio of one pass is limited to 70% or less, or the number of rolling reduction times (the number of passes) is limited to 10 times or less, a concern about a decrease of temperature or excessive generation of scales are capable of being reduced. Accordingly, in the rough rolling, the rolling reduction ratio of one pass may be 70% or less, and the number of rolling reduction times (the number of passes) may be 10 times or less.

As described above, when the austenite grain size before finish rolling is made small, recrystallization of austenite in the subsequent finish rolling is promoted, and thus the reduction of the austenite grain size is effective to improve local deformability.

The effect is assumed to be because an austenite grain boundary after the rough rolling (that is, before the finish rolling) functions as one of recrystallization nuclei during finish rolling.

So as to confirm the austenite grain size after the rough rolling, it is preferable to quickly cool the steel (steel sheet) before entering the finish rolling at a cooling rate as high as possible. For example, the steel sheet is cooled at an average cooling rate of 10° C./s or higher. Furthermore, a cross-section of a sheet piece collected from the steel sheet obtained after cooling is etched to make an austenite grain boundary in a microstructure emerge to the front, and then measurement using an optical microscope is performed. At this time, with respect to 20 viewing fields or more at a magnification of 50 times, the austenite grain size is measured by image analysis or an intercept method, and respective austenite grain sizes are averaged to obtain an average austenite grain size.

After the rough rolling, finish rolling may be continuously performed after jointing a sheet bar. At this time, a rough bar may be wound at once into a coil, and may be stored in a cover having a heat retention function as necessary, and jointing may be performed after rewinding the coil again.

In addition, as one condition for controlling the average pole density of the orientation group from {100}<011> to {223}<110> and the pole density of the crystal orientation {332}<113> at the sheet thickness central portion within a range of the ⅝ to ⅜ of sheet thickness within the above-described pole density ranges, a rolling is controlled in the finish rolling (second hot rolling) after the rough rolling with a temperature T1 (° C.), which may be determined as shown in the following Expression 7 by a chemical composition (by mass %) of steel, set as a reference.

$$T1=850+10\times([C]+[N])\times[Mn]+350\times[Nb]+250\times[Ti]+40\times[B]+10\times[Cr]+100\times[Mo]+100\times[V] \quad \text{(Expression 7)}$$

In addition, in Expression 7, [C], [N], [Mn], [Nb], [Ti], [B], [Cr], [Mo], and [V] represent mass percentages of the content of C, the content of N, the content of Mn, the content of Nb, the content of Ti, the content of B, the content of Cr, the content of Mo, and the content of V in the steel, respectively. In addition, calculation is performed while setting the content of chemical elements (chemical components) not contained in Expression 7 to 0%. Therefore, in the basic composition that contains only the above-described basic components, the following Expression 8 may be used instead of Expression 7.

$$T1=850+10\times([C]+[N])\times[Mn] \quad \text{(Expression 8)}$$

In addition, when steel contains selective elements, it is necessary for a temperature calculated by Expression 7 instead of the temperature calculated by Expression 8 to be set as T1 (° C.).

In the finish rolling, the temperature T1 (° C.) that may be obtained by Expression 7 or Expression 8 is set as a reference, a large rolling reduction ratio is secured in a temperature range of T1+30° C. to T1+200° C. (preferably, a temperature range of T1+50° C. to T1+100° C.), and the rolling reduction ratio is limited to a small range (including 0%) in a temperature range that is higher than or equal to $Ar_3$° C. and lower than T1+30° C. When the finish rolling is performed in addition to the rough rolling, local deformability of a final product may be raised.

When the large rolling reduction ratio is secured in a temperature range of T1+30° C. to T1+200° C., and the rolling reduction ratio is limited in a temperature range that is higher than or equal to $Ar_3$° C. and lower than T1+30° C., the average pole density of the orientation group from {100}<011> to {223}<110> and the pole density of the crystal orientation {332}<113> at the sheet thickness central portion within a range of the ⅝ to ⅜ of the sheet thickness are sufficiently controlled. Accordingly, local deformability of the final product is dramatically improved. The temperature T1 itself is empirically obtained. The present inventors have empirically found the following fact through experiment. That is, a temperature range in which recrystallization in an austenite range of each steel is promoted may be determined with the temperature T1 set as a reference. So as to obtain further satisfactory local deformability, it is important to accumulate a large amount of strains by rolling reduction, and thus an accumulative rolling reduction ratio within a temperature range of T1+30° C. to T1+200° C. is 50% or more. In addition, from the viewpoint of promoting recrystallization by strain accumulation, it is preferable that the accumulative rolling reduction ratio is 70% or more. In addition, when the upper limit of the accumulative rolling reduction ratio is limited, the rolling temperature may be further sufficiently secured, and thus a rolling load may be further suppressed. Accordingly, the accumulative rolling reduction ratio may be 90% or less.

Furthermore, so as to increase the homogeneity of the hot-rolled sheet, and to raise the elongation and local ductility of a final product to the limit, the finish rolling is controlled to include a large-rolling-reduction pass having a rolling reduction ratio of 30% or more in a temperature range of T1+30° C. to T1+200° C. In this manner, in the finish rolling, in a temperature range of T1+30° C. to T1+200° C., at least one time of rolling reduction having a rolling reduction ratio of 30% or more is performed. Particularly, when considering the cooling control, to be described later, the rolling reduction ratio of the final pass in the temperature range is 30% or more. That is, it is preferable that the final pass is the large-rolling-reduction pass. In a case where further higher workability is required, the rolling reduction ratios of final two passes may be set to 30% or more, respectively. In a case of further raising homogeneity of a hot-rolled sheet, the rolling reduction ratio of the large-rolling-reduction pass (one pass) may be 40% or more. In addition, in a case of obtaining a further satisfactory shape of a steel sheet, the rolling reduction ratio of the large-rolling-reduction pass (one pass) may be 70% or less.

In addition, in a temperature range of T1+30° C. to T1+200° C., when temperature rising of a steel sheet between respective rolling passes is suppressed (for example, 18° C. or lower), further uniform recrystallized austenite may be obtained.

Furthermore, uniform recrystallization is promoted by release of accumulated strains. Accordingly, after rolling reduction in a temperature range of T1+30° C. to T1+200° C. is terminated, an amount of processing in a temperature range that is higher than or equal to $Ar_3$° C. and lower than T1+30° C. (preferably, T1° C. to lower than T1+30° C.) is suppressed to be as small as possible. Accordingly, the accumulative rolling reduction ratio in a temperature range that is higher than or equal to $Ar_3$° C. and lower than T1+30° C. is limited to 30% or less. In a case of securing excellent sheet shape in this temperature range, the accumulative rolling reduction ratio of 10% or more is preferable. However, in a case where high value is set on local deformability, it is preferable that the accumulative rolling reduction ratio is 10% or less, and more preferably 0%. That is, in a temperature range that is higher than or equal to $Ar_3$° C. and lower than T1+30° C., it is not necessary to perform the rolling reduction, and even when the rolling reduction is performed, the accumulative rolling reduction ratio is set to 30% or less.

In addition, when the rolling reduction ratio in a temperature range that is higher than or equal to $Ar_3°$ C. and lower than T1+30° C. is large, recrystallized austenite grain is expanded, and thus local deformability deteriorates.

That is, with regard to production conditions related to the embodiment, when austenite is uniformly and finely recrystallized in the finish rolling, the texture and r value of a hot-rolled product are controlled. Accordingly, local deformability such as hole expansibility and bendability may be improved.

When rolling is performed in a temperature range lower than $Ar_3°$ C., or the accumulative rolling reduction ratio in a temperature range that is higher than or equal to $Ar_3°$ C. and lower than T1+30° C. is too large, the texture of austenite develops. As a result, a hot-rolled steel sheet that may be ultimately obtained that does not satisfy at least one of a condition in which the average pole density of the orientation group from {100}<011> to {223}<110> in the sheet thickness central portion is 1.0 to 6.5, and a condition in which the pole density of the crystal orientation {332}<113> is 1.0 to 5.0. On the other hand, in the finish rolling, when rolling is performed in a temperature range higher than T1+200° C., or the accumulative rolling reduction ratio is too small, coarse grains or mixed grains may be included in the microstructure, or the microstructure may be constituted by mixed grains. In addition, in this case, an area ratio of grains exceeding 20 μm or a volume average diameter increases.

Here, the rolling reduction ratio may be obtained by actual results or calculation in measurement of a rolling load or a sheet thickness, and the like. In addition, a rolling temperature (for example, each of the temperature ranges above) may be obtained by actual measurement using a thermometer between stands, by calculation through a calculation simulation in consideration of processing heat generation due to a line speed, a rolling reduction ratio, or the like, or by performing both of them (actual measurement and calculation). In addition, in the above description, the rolling reduction ratio in one pass represents a percentage of a rolling reduction amount in one pass to an inlet sheet thickness before passing through a rolling stand (a difference between the inlet sheet thickness before passing through the rolling stand and an outlet sheet thickness after passing the rolling stand). When an inlet sheet thickness before first pass in rolling in each of the temperature ranges above is set as a reference, the accumulative rolling reduction ratio represents a percentage of an accumulative rolling reduction amount to the reference (a difference between the inlet sheet thickness before first pass in the rolling in each of the temperature ranges above and the outlet sheet thickness after a final pass in rolling in each of the temperature ranges). Furthermore, $Ar_3$ temperature is obtained by the following Expression 9.

$$Ar_3=879.4-516.1\times[C]-65.7\times[Mn]+38.0\times[Si]+274.7\times[P] \quad \text{(Expression 9)}$$

With regard to the hot rolling (finish rolling) that is performed as described above, when the hot rolling is terminated at a temperature lower than $Ar_3$ (° C.), steel is rolled at two-phase region (two-phase temperature region) including austenite and ferrite, and thus integration of the crystal orientation to the orientation group from {100}<011> to {223}<110> becomes strong. As a result, local deformability significantly deteriorates. Here, when the rolling termination temperature of the finish rolling is 11° C. or higher, an amount of strain in a temperature range of T1° C. or lower may be reduced, and thus anisotropy may be further reduced. As a result, local deformability may be further increased. Accordingly, the rolling termination temperature of the finish rolling may be T1° C. or higher.

In addition, cooling (primary cooling) after final large-rolling-reduction pass (rolling reduction at a rolling stand) of the rolling in a temperature range of T1+30° C. to T1+200° C. has a large effect on a grain size of a final product. In addition, due to the cooling, an equiaxed (uniform-size) grain is obtained, and thus the microstructure may be controlled to have less coarse grain.

Steel is cooled after a rolling stand corresponding to the final pass among the large-rolling-reduction passes in such a manner that a standby time t (second), which is taken before primary cooling initiation after completion of the final pass among the large-rolling-reduction passes (as described above, the large-rolling-reduction passes represent rolling reduction (pass) having a rolling reduction ratio of 30% or more in the temperature range of T1+30° C. to T1+200° C.) in the hot rolling, satisfies Expression 10. Here, t1 in Expression 10 may be obtained by the following Expression 11. In Expression 11, Tf represents a temperature (° C.) of a steel sheet at the time of completion of the final pass of the large-rolling-reduction passes, and P1 represents a rolling reduction ratio (%) in the final pass among the large-rolling reduction passes. Here, when considering runability (for example, shape correction or controllability of secondary cooling), the primary cooling may be performed between rolling stands.

When the standby time t exceeds the right-side value (2.5×t1) of Expression 10, recrystallization is almost completed, on the other hand, grains significantly are grown, and thus a grain size increases. Therefore, the r value and elongation decrease. Accordingly, the standby time t is set to 2.5×t1 seconds or less.

$$t \leq 2.5 \times t1 \quad \text{(Expression 10)}$$

$$t1=0.001\times((Tf-T1)\times P1/100)^2-0.109\times((Tf-T1)\times P1/100)+3.1 \quad \text{(Expression 11)}$$

When the standby time t is further limited to be less than t1 seconds, the growth of the grain may be largely suppressed. In this case, a volume-average diameter of a final product may be controlled to 4 μm or less. As a result, even when recrystallization does not sufficiently progress, the elongation of the steel sheet may be sufficiently improved, and at the same time, fatigue properties may be improved.

On the other hand, when the standby time t is further limited to t1 seconds to 2.5×t1 seconds, the volume-average diameter increases (for example, exceeding 4 μm) compared to a case in which the standby time t1 is less than t1. However, recrystallization sufficiently progresses, and thus the crystal orientation becomes random. Accordingly, the elongation of the steel sheet may be sufficiently improved, and at the same time, isotropy may be largely improved.

In addition, the above-described primary cooling may be performed between rolling stands or after the final rolling stand. That is, after performing the primary cooling, rolling having a low rolling reduction ratio (for example, 30% or less (or less than 30%)) may be performed in a temperature range of $Ar_3°$ C. or higher (for example, from $Ar_3$ (° C.) to T1+30 (or Tf) (° C.)).

It is preferable that a cooling temperature variation that is a difference between a steel sheet temperature (steel temperature) at the time of cooling initiation and a steel sheet temperature (steel temperature) at the time of cooling termination in the primary cooling is 40° C. to 140° C. In addition, it is preferable that the steel sheet temperature T2 at the time of cooling completion of the primary cooling is T1+100° C. or lower. When the cooling temperature variation is 40° C. or higher, grain growth of the recrystallized austenite grain may be further suppressed. When the cooling temperature variation is 140° C. or lower, recrystallization may further sufficiently progress, and thus the pole density may be further improved. In addition, when the cooling temperature variation is limited to 140° C. or lower, the temperature of the steel sheet may be controlled in a relatively easy manner, and variant selection (avoiding of variant limitation) may be controlled in a relatively effective manner, and thus development of a texture may be further suppressed. Accordingly, in this case, isotropy may be further raised, and thus orientation dependence of workability may be further decreased. Furthermore, when the steel sheet temperature T2 at the time of cooling termination of the primary cooling is T1+100° C. or lower, a further sufficient cooling effect may be obtained. Due to the cooling effect, grain growth may be suppressed, and thus an increase of austenite grain size may be further suppressed.

In addition, it is preferable that an average cooling rate in the primary cooling is 50° C./s or more. When the average cooling rate in the primary cooling is 50° C./s or more, grain growth of recrystallized austenite grain may be further suppressed. On the other hand, it is not necessary to particularly set the upper limit of the average cooling rate, but the average cooling rate may be 200° C./s or less from the viewpoint of a sheet shape.

After the finish rolling, steel is cooled at an average cooling rate of from 10° C./s to 100° C./s to a temperature T3 within a range of 630° C. to 800° C. that is in the vicinity of a nose of a pro-eutectoid ferrite range (secondary cooling). Then, the steel is retained for 1 to 20 seconds in a temperature range of 630° C. to 800° C., or slowly cooled to a temperature within a range that is higher than or equal to 550° C. and lower than the temperature T3 from the temperature T3 at an average cooling rate of 20° C./s. A sufficient amount of ferrite may be easily obtained by the temperature control. In addition, a grain may be refined by the cooling in 630° C. to 800° C. at an average cooling rate of 10° C./s. In a case of a substantial isothermal retention treatment, when a retention time exceeds 20 seconds, a fraction of ferrite becomes too high, and thus strength decreases. On the other hand, when the retention time is less than one second, an amount of generation of ferrite becomes deficient. In addition, when a temperature at which the slow cooling is stopped is lower than 550° C. or a cooling stopping temperature before the retention or slow cooling is lower than 630° C., there is a possibility in that pearlite transformation may occur. Therefore, the temperature at which the slow cooling is stopped is set to 550° C. or higher, and the cooling stopping temperature before the retention or slow cooling is set to 630° C. or higher.

Furthermore, the steel is cooled to a temperature within a range of 350° C. to 500° C. and is wound. After performing a temperature range control of retaining the wound coil (steel) within a range of 350° C. to 500° C. for 30 minutes to 300 minutes, the resultant coil is cooled with air. When the winding temperature is higher than 500° C., bainitic transformation excessively progresses. In addition, when the winding temperature is lower than 350° C., the bainitic transformation is excessively suppressed, and thus stabilization of retained austenite by C-concentration is not sufficient. Furthermore, in this case, martensitic transformation occurs during air cooling, and thus it is not possible to obtain a sufficient amount of retained austenite. In addition, when the retention time at 350° C. to 500° C. is less than 30 minutes, the progress of bainitic transformation is not sufficient, and the fraction of retained austenite decreases. On the other hand, the retention time exceeds 300 minutes, cementite precipitates or precipitated cementite grows, and thus the target fraction of retained austenite may not be obtained. Furthermore, when a temperature variation rate of the coil in the temperature range control is −40° C./h to 40° C./h, a temperature variation in the coil gradually occurs. Accordingly, material qualities in the coil may be controlled to be further homogeneous.

According to the above-described production method, a hot-rolled steel sheet having excellent local deformability may be obtained.

In addition, with respect to the hot-rolled steel sheet that is obtained, skin pass rolling may be performed as necessary. According to the skin pass rolling, a stretcher strain that occurs during machining may be prevented, a shape of a steel sheet may be corrected.

In addition, the hot-rolled steel sheet that is obtained may be subjected to a surface treatment. For example, surface treatments such as electro coating, hot-dip coating, deposition coating, an alloying treatment after coating, organic film formation, film laminating, a treatment using organic salts/inorganic salts, and a non-chromium treatment may be applied to the hot-rolled steel sheet that is obtained. As an example of these treatments, a hot-dip galvanized layer or a galvannealed layer may be formed on a surface the hot-rolled steel sheet. Even when the surface treatments are performed, local deformability may be sufficiently maintained.

Figure 6:
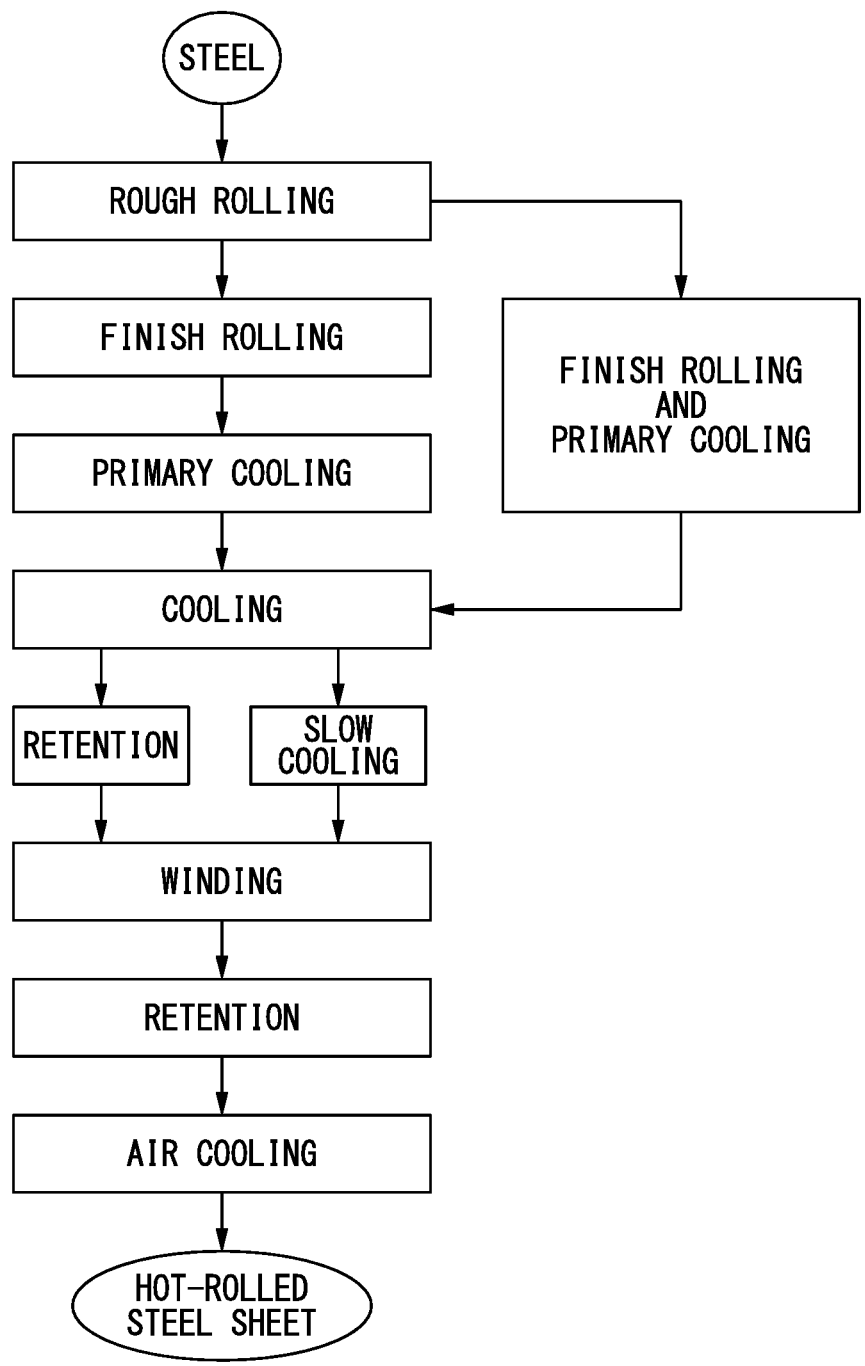
FIG. 6 is a flowchart illustrating the outline of a production method of the hot-rolled steel sheet related to an embodiment of the present invention.

For reference, FIG. 6 shows a flowchart illustrating the outline of a production method of the hot-rolled steel sheet related to the embodiment.

EXAMPLES

The technical content of the present invention will be described with reference to examples of the present invention.

Results of examination performed using steel a to steel t having a chemical composition (the balance includes Fe and unavoidable impurities) shown in Tables 1 and 2 will be described. The steel was melted and casted. Then, the steel was heated to a temperature range of 900° C. to 1,300° C. by reheating the steel as is, or reheating steel that was cooled at once to room temperature. Then, hot rolling (an austenite range that is a temperature range of $Ar_3$ or higher) and a temperature control (cooling or retention) was performed under production conditions shown in Tables 3 to 6, whereby a hot-rolled steel sheet having a thickness of from 2 mm to 5 mm was obtained.

TABLE 1

| STEEL | CHEMICAL COMPONENT/BY MASS % | | | | | | | | | T1/ | Ar3/ |
|---|---|---|---|---|---|---|---|---|---|---|---|
| No. | C | Si | Mn | P | S | Al | Si + Al | N | O | °C. | °C. |
| a | 0.15 | 1.5 | 2.5 | 0.11 | 0.005 | 0.01 | 1.51 | 0.003 | 0.005 | 854 | 725 |
| b | 0.15 | 1.58 | 3.47 | 0.09 | 0.004 | 0.8 | 2.38 | 0.0025 | 0.001 | 870 | 659 |
| c | 0.2 | 2.1 | 2.15 | 0.08 | 0.01 | 0.01 | 2.11 | 0.001 | 0.003 | 892 | 737 |
| d | 0.44 | 0.5 | 1.8 | 0.01 | 0.009 | 1.5 | 2 | 0.004 | 0.002 | 888 | 556 |
| e | 0.81 | 1.55 | 3 | 0.07 | 0.012 | 1.2 | 2.75 | 0.006 | 0.004 | 874 | 342 |
| f | 0.22 | 1.5 | 2.5 | 0.09 | 0.011 | 3.8 | 5.3 | 0.0055 | 0.009 | 887 | 683 |
| g | 0.28 | 1.5 | 0.05 | 0.04 | 0.017 | 2.1 | 3.6 | 0.0013 | 0.008 | 883 | 800 |
| h | 0.34 | 0.15 | 2.9 | 0.018 | 0.022 | 3.2 | 3.35 | 0.0089 | 0.004 | 899 | 524 |
| i | 0.24 | 0.94 | 3.5 | 0.2 | 0.04 | 1.5 | 2.44 | 0.01 | 0.0036 | 879 | 616 |
| j | 0.001 | 2.5 | 3.6 | 0.13 | 0.006 | 1 | 3.5 | 0.05 | 0.002 | 888 | 773 |
| k | 0.025 | 1.3 | 2.5 | 0.11 | 0.004 | 0.3 | 1.6 | 0.004 | 0.005 | 851 | 782 |
| l | 0.073 | 1.5 | 2.3 | 0.08 | 0.003 | 0.1 | 1.6 | 0.003 | 0.006 | 875 | 770 |
| m | 0.095 | 1.4 | 1.9 | 0.02 | 0.008 | 0.01 | 1.41 | 0.008 | 0.008 | 852 | 764 |
| n | 0.11 | 0.4 | 2.4 | 0.06 | 0.01 | 1.5 | 1.9 | 0.009 | 0.009 | 903 | 697 |
| o | 0.13 | 0.002 | 1.6 | 0.08 | 0.006 | 2.1 | 2.102 | 0.01 | 0.01 | 882 | 729 |
| p | 0.19 | 2.1 | 1.8 | 0.04 | 0.007 | 0.01 | 2.11 | 0.003 | 0.007 | 882 | 754 |
| q | 0.075 | 2.8 | 0.8 | 0.13 | 0.013 | 0.01 | 2.81 | 0.002 | 0.002 | 917 | 930 |
| r | 0.061 | 3.9 | 0.7 | 0.12 | 0.012 | 0.01 | 3.91 | 0.009 | 0.003 | 864 | 983 |
| s | 0.15 | 1.8 | 0.005 | 0.06 | 0.011 | 0.01 | 1.81 | 0.002 | 0.004 | 860 | 887 |
| t | 0.03 | 0.003 | 1.3 | 0.08 | 0.027 | 3.9 | 3.903 | 0.01 | 0.008 | 880 | 801 |

TABLE 2

| STEEL | CHEMICAL COMPONENT/BY MASS % | | | | | | | | | | | | | | | |
|---|---|---|---|---|---|---|---|---|---|---|---|---|---|---|---|---|
| No. | Ti | Nb | V | W | Cu | B | Mo | Cr | As | Mg | REM | Ca | Ni | Co | Sn | Zr |
| a | 0 | 0 | 0 | 0 | 0 | 0 | 0 | 0 | 0 | 0 | 0 | 0 | 0 | 0.05 | 0 | 0 |
| b | 0.06 | 0 | 0 | 0.03 | 0 | 0 | 0 | 0 | 0 | 0 | 0 | 0 | 0 | 0 | 0.1 | 0 |
| c | 0 | 0 | 0 | 0.04 | 0 | 0 | 0.38 | 0 | 0 | 0 | 0 | 0 | 0 | 0 | 0 | 0 |
| d | 0 | 0 | 0.3 | 0 | 0 | 0 | 0 | 0 | 0 | 0 | 0.03 | 0 | 0 | 0 | 0 | 0.015 |
| e | 0 | 0 | 0 | 0.06 | 0 | 0 | 0 | 0 | 0 | 0 | 0 | 0.005 | 0 | 0 | 0 | 0 |
| f | 0 | 0.09 | 0 | 0.1 | 0.002 | 0 | 0 | 0 | 0 | 0.008 | 0 | 0 | 0 | 0 | 0 | 0 |
| g | 0.09 | 0.03 | 0 | 0 | 0 | 0 | 0 | 0 | 0.3 | 0 | 0 | 0.009 | 0 | 0 | 0 | 0 |
| h | 0 | 0 | 0 | 0 | 0 | 0.0022 | 0 | 3.9 | 0 | 0 | 0 | 0 | 0 | 0 | 0 | 0 |
| i | 0.04 | 0.03 | 0 | 0.02 | 0.002 | 0 | 0 | 0 | 0 | 0 | 0 | 0 | 0 | 0 | 0 | 0 |
| j | 0 | 0 | 0 | 0 | 0 | 0 | 0.36 | 0 | 0 | 0 | 0 | 0 | 0 | 0 | 0 | 0 |
| k | 0 | 0 | 0 | 0 | 0 | 0 | 0 | 0 | 0 | 0 | 0 | 0 | 0 | 0 | 0 | 0 |
| l | 0 | 0 | 0 | 0 | 0 | 0 | 0.23 | 0 | 0 | 0 | 0 | 0.004 | 0 | 0 | 0 | 0 |
| m | 0 | 0 | 0 | 0 | 0 | 0 | 0 | 0 | 0 | 0.003 | 0 | 0 | 0 | 0 | 0 | 0 |
| n | 0.16 | 0 | 0 | 0 | 0 | 0 | 0.1 | 0 | 0 | 0 | 0.09 | 0 | 0 | 0.03 | 0 | 0.15 |
| o | 0 | 0 | 0 | 0.03 | 0.014 | 0 | 0.3 | 0 | 0 | 0 | 0 | 0 | 0.6 | 0 | 0 | 0 |
| p | 0.1 | 0 | 0 | 0 | 0 | 0.002 | 0.03 | 0 | 0 | 0 | 0 | 0 | 0 | 0 | 0 | 0 |
| q | 0.2 | 0.03 | 0 | 0 | 0.03 | 0 | 0 | 0.6 | 0 | 0 | 0 | 0 | 0 | 0 | 0.15 | 0 |
| r | 0.001 | 0 | 0 | 0.09 | 0.025 | 0 | 0 | 1.3 | 0 | 0 | 0 | 0 | 0 | 0 | 0 | 0 |
| s | 0.03 | 0 | 0 | 0 | 0 | 0 | 0.01 | 0.1 | 0.03 | 0 | 0.04 | 0 | 1.9 | 0 | 0 | 0 |
| t | 0 | 0 | 0.2 | 0 | 0 | 0 | 0.03 | 0.6 | 0 | 0 | 0 | 0 | 0 | 0 | 0 | 0 |

Tables 7 to 9 show characteristics and mechanical properties of a microstructure (including a texture). In addition, in Tables 7 to 9, y, F, B, M, and P represent area ratios of retained austenite, ferrite, bainite, martensite, and pearlite, respectively. In addition, $f_{20}$, $d_V$, and $\sigma_{MA}$ represent a percentage of an area ratio of a grain (coarse grain) exceeding 20 μm, a volume-average diameter of a grain, and standard deviation of the above-described distance $L_{MA}$, respectively.

As an index of local deformability, hole expanding ratio λ and the limit bend radius (d/RmC) according to 90° V-bending of the final product were used. In addition, a tensile test (measurement of TS and EL), a bending test, and a hole expanding test were performed according to JIS Z 2241, JIS Z 2248 (V-block 90° bending test), and Japan Iron and Steel Federation Standard JFS T1001, respectively. In addition, with respect to the sheet thickness central portion within a region of 5/8 to 3/8 of a sheet thickness cross-section which is parallel with a rolling direction at a ¼ position in a sheet width direction, a pole density was measured at a pitch of 0.5 μm using the above-described EBSD. In addition, r values (rC, r30) of respective directions were measured by the above-described method according to JIS Z 2254 (2008) (ISO10113 (2006)).

In addition, an underline in Tables 1 to 8 indicates conditions not satisfying the conditions of the present invention. In addition, in Production No. 38, since rolling within a temperature range of T1+30° C. to T1+200° C. does not include a pass of 30% or more, as a value of P1, a rolling reduction ratio of the final pass in the rolling within a temperature range of T1+30° C. to T1+200° C. was used.

TABLE 3

| PRODUCTION No. | STEEL No. | T1/ °C. | NUMBER OF TIMES OF ROLLING REDUCTION OF 40% OR MORE AT 1,000° C. TO 1,200° C./— | ROLLING REDUCTION RATIO OF 40% OR MORE AT 1,000° C. TO 1,200° C./% | | AUSTENITE GRAIN SIZE/μm |
|---|---|---|---|---|---|---|
| 1 | a | 854 | 1 | 50 | | 120 |
| 2 | a | 854 | 1 | 45 | | 130 |
| 3 | b | 870 | 1 | 40 | | 140 |
| 4 | b | 870 | 1 | 50 | | 130 |
| 5 | c | 892 | 1 | 45 | | 130 |
| 6 | c | 892 | 1 | 45 | | 130 |
| 7 | d | 888 | 1 | 40 | | 160 |
| 8 | d | 888 | 1 | 45 | | 150 |
| 9 | a | 854 | 1 | 50 | | 120 |
| 10 | a | 854 | 2 | 40 | 40 | 70 |
| 11 | b | 870 | 2 | 45 | 45 | 70 |
| 12 | c | 892 | 2 | 45 | 45 | 70 |
| 13 | c | 892 | 2 | 40 | 40 | 95 |
| 14 | d | 888 | 2 | 50 | 40 | 90 |
| 15 | a | 854 | 1 | 50 | | 120 |
| 16 | b | 870 | 2 | 45 | 45 | 70 |
| 17 | c | 892 | 2 | 45 | 45 | 70 |
| 18 | d | 888 | 2 | 40 | 45 | 95 |
| 19 | g | 883 | 0 | | | 350 |
| 20 | j | 888 | 1 | 50 | | 120 |
| 21 | e | 874 | CRACKED DURING HOT ROLLING | | | |
| 22 | f | 887 | CRACKED DURING HOT ROLLING | | | |
| 23 | h | 899 | CRACKED DURING HOT ROLLING | | | |
| 24 | i | 879 | CRACKED DURING HOT ROLLING | | | |
| 25 | k | 851 | 1 | 50 | | 105 |
| 26 | l | 875 | 2 | 45 | 45 | 90 |
| 27 | m | 852 | 1 | 50 | | 130 |
| 28 | n | 903 | 1 | 50 | | 130 |
| 29 | o | 882 | 2 | 45 | 45 | 80 |
| 30 | p | 882 | 1 | 50 | | 105 |
| 31 | q | 917 | 2 | 50 | 45 | 65 |
| 32 | r | 864 | 1 | 50 | | 130 |
| 33 | s | 860 | 1 | 50 | | 160 |
| 34 | t | 880 | 1 | 50 | | 180 |
| 35 | a | 854 | 1 | 45 | | 130 |
| 36 | c | 892 | 2 | 40 | 40 | 95 |
| 37 | c | 892 | 2 | 40 | 40 | 95 |
| 38 | c | 892 | 2 | 40 | 40 | 95 |
| 39 | c | 892 | 2 | 40 | 40 | 95 |
| 40 | j | 888 | 1 | 50 | | 120 |

TABLE 4

| PRODUCTION No. | ACCUMULATIVE ROLLING REDUCTION RATIO AT T1 + 30° C. TO T1 + 200° C./% | ROLLING REDUCTION RATIO BEFORE ONE PASS OF FINAL PASS AT T1 + 30° C. TO T1 + 200° C./% | ROLLING REDUCTION RATIO OF FINAL PASS AT T1 + 30° C. TO T1 + 200° C./% | NUMBER OF TIMES OF ROLLING REDUCTION OF 30% OR MORE AT T1 + 30° C. TO T1 + 200° C./— | MAXIMUM TEMPERATURE RISING DURING ROLLING REDUCTION AT T1 + 30° C. TO T1 + 200° C./° C. |
|---|---|---|---|---|---|
| 1 | 73.0 | 55 | 40 | 2 | 15 |
| 2 | 67.5 | 50 | 35 | 2 | 5 |
| 3 | 59.1 | 35 | 37 | 2 | 15 |
| 4 | 62.1 | 45 | 31 | 2 | 18 |
| 5 | 58.6 | 40 | 31 | 2 | 13 |
| 6 | 79.0 | 65 | 40 | 2 | 14 |
| 7 | 61.5 | 45 | 30 | 2 | 16 |
| 8 | 64.3 | 49 | 30 | 2 | 17 |
| 9 | 60.8 | 44 | 30 | 2 | 18 |
| 10 | 71.3 | 59 | 30 | 2 | 18 |
| 11 | 67.0 | 45 | 40 | 2 | 13 |
| 12 | 62.8 | 38 | 40 | 2 | 15 |
| 13 | 55.8 | 33 | 34 | 2 | 20 |
| 14 | 58.7 | 41 | 30 | 2 | 20 |
| 15 | 40.5 | 15 | 30 | 1 | 12 |
| 16 | 51.0 | 30 | 30 | 1 | 20 |
| 17 | 50.3 | 29 | 30 | 1 | 15 |
| 18 | 70.6 | 58 | 30 | 1 | 12 |
| 19 | 48.7 | 21 | 35 | 1 | 30 |
| 20 | 74.8 | 58 | 40 | 1 | 40 |
| 21 | CRACKED DURING HOT ROLLING | | | | |
| 22 | CRACKED DURING HOT ROLLING | | | | |
| 23 | CRACKED DURING HOT ROLLING | | | | |
| 24 | CRACKED DURING HOT ROLLING | | | | |
| 25 | 73.0 | 55 | 40 | 2 | 20 |
| 26 | 69.8 | 45 | 45 | 2 | 15 |
| 27 | 68.5 | 55 | 30 | 2 | 10 |
| 28 | 70.8 | 55 | 35 | 2 | 15 |
| 29 | 76.0 | 60 | 40 | 2 | 15 |
| 30 | 75.5 | 65 | 30 | 2 | 20 |
| 31 | 54.5 | 30 | 35 | 2 | 16 |
| 32 | 64.3 | 49 | 30 | 2 | 24 |
| 33 | 72.0 | 60 | 30 | 2 | 23 |
| 34 | 69.0 | 55 | 31 | 2 | 16 |
| 35 | 45.6 | 15 | 36 | 1 | 12 |
| 36 | 45.7 | 33 | 19 | 1 | 20 |
| 37 | 55.8 | 33 | 34 | 2 | 20 |

TABLE 4-continued

| PRODUCTION No. | ACCUMULATIVE ROLLING REDUCTION RATIO AT T1 + 30° C. TO T1 + 200° C./% | ROLLING REDUCTION RATIO BEFORE ONE PASS OF FINAL PASS AT T1 + 30° C. TO T1 + 200° C./% | ROLLING REDUCTION RATIO OF FINAL PASS AT T1 + 30° C. TO T1 + 200° C./% | NUMBER OF TIMES OF ROLLING REDUCTION OF 30% OR MORE AT T1 + 30° C. TO T1 + 200° C./— | MAXIMUM TEMPERATURE RISING DURING ROLLING REDUCTION AT T1 + 30° C. TO T1 + 200° C./° C. |
|---|---|---|---|---|---|
| 38 | 57.0 | 20 | 20 | <u>0</u> | 20 |
| 39 | 55.8 | 33 | 34 | 2 | 20 |
| 40 | 74.8 | 58 | 40 | 1 | 40 |

TABLE 5

| PRODUCTION No. | ACCUMULATIVE ROLLING REDUCTION RATIO AT A TEMPERATURE EQUAL TO OR HIGHER THAN $Ar_3$° C. AND LOWER THAN T1 + 30° C./% | Tf/ ° C. | P1/ % | t1/s | 2.5 × t1/s | t/s | t/t1/— | COOLING RATE OF PRIMARY COOLING/ ° C./s | VARIATION IN COOLING TEMPERATURE AT PRIMARY COOLING/° C. |
|---|---|---|---|---|---|---|---|---|---|
| 1 | 10 | 935 | 40 | 0.62 | 1.55 | 0.8 | 1.29 | 50 | 50 |
| 2 | 0 | 892 | 35 | 1.83 | 4.57 | 2 | 1.10 | 60 | 60 |
| 3 | 25 | 945 | 37 | 0.85 | 2.11 | 1 | 1.18 | 60 | 90 |
| 4 | 5 | 920 | 31 | 1.65 | 4.13 | 2.3 | 1.39 | 70 | 80 |
| 5 | 15 | 955 | 31 | 1.35 | 3.38 | 2 | 1.48 | 80 | 80 |
| 6 | 0 | 934 | 40 | 1.55 | 3.88 | 2.2 | 1.42 | 70 | 70 |
| 7 | 25 | 970 | 30 | 1.02 | 2.56 | 0.9 | 0.88 | 70 | 90 |
| 8 | 5 | 960 | 30 | 1.21 | 3.03 | 1 | 0.83 | 70 | 60 |
| 9 | 15 | 921 | 30 | 1.31 | 3.28 | 2 | 1.52 | 70 | 80 |
| 10 | 0 | 990 | 30 | 0.32 | 0.79 | 0.7 | 2.21 | 70 | 40 |
| 11 | 0 | 1012 | 40 | 0.14 | 0.34 | 0.3 | 2.22 | 60 | 60 |
| 12 | 10 | 985 | 40 | 0.43 | 1.07 | 0.9 | 2.10 | 60 | 60 |
| 13 | 25 | 965 | 34 | 1.01 | 2.53 | 1.2 | 1.19 | 50 | 60 |
| 14 | 15 | 993 | 30 | 0.66 | 1.65 | 0.8 | 1.21 | 50 | 60 |
| 15 | <u>45</u> | 880 | 30 | 2.31 | 5.78 | 5 | 2.16 | 30 | 60 |
| 16 | 21 | 930 | 30 | 1.46 | 3.66 | 5 | <u>3.42</u> | 40 | 90 |
| 17 | 29 | 1075 | 30 | 0.13 | 0.32 | 0.1 | 0.77 | 60 | 50 |
| 18 | 29 | 890 | 30 | 3.03 | 7.59 | 15 | <u>4.94</u> | 80 | 10 |
| 19 | <u>35</u> | 910 | 35 | 2.16 | 5.40 | 0.5 | 0.23 | 60 | 30 |
| 20 | <u>35</u> | 860 | 40 | 4.45 | 11.12 | 9 | 2.02 | 60 | 60 |
| 21 | | CRACKED DURING HOT ROLLING | | | | | | | |
| 22 | | CRACKED DURING HOT ROLLING | | | | | | | |
| 23 | | CRACKED DURING HOT ROLLING | | | | | | | |
| 24 | | CRACKED DURING HOT ROLLING | | | | | | | |
| 25 | 10 | 880 | 40 | 1.97 | 4.93 | 1.5 | 0.76 | 50 | 90 |
| 26 | 16 | 910 | 45 | 1.63 | 4.08 | 2.5 | 1.53 | 60 | 80 |
| 27 | 20 | 900 | 30 | 1.74 | 4.34 | 0.8 | 0.46 | 60 | 100 |
| 28 | 16 | 890 | 35 | 3.62 | 9.04 | 2.2 | 0.61 | 60 | 160 |
| 29 | 14 | 920 | 40 | 1.67 | 4.19 | 0.6 | 0.36 | 60 | 50 |
| 30 | 13 | 940 | 30 | 1.51 | 3.77 | 1.2 | 0.80 | 80 | 60 |
| 31 | 11 | 945 | 35 | 2.13 | 5.32 | 1.6 | 0.75 | 60 | 90 |
| 32 | 12 | 885 | 30 | 2.45 | 6.13 | 1.8 | 0.73 | 60 | 100 |
| 33 | 16 | 870 | 30 | 2.78 | 6.96 | 0.2 | 0.07 | 60 | 80 |
| 34 | 18 | 915 | 31 | 2.04 | 5.09 | 0.6 | 0.30 | 70 | 75 |
| 35 | <u>45</u> | 880 | 36 | 2.17 | 5.42 | 5 | 2.31 | 30 | 60 |
| 36 | 25 | 965 | 33 | 1.05 | 2.64 | 1.2 | 1.14 | 50 | 60 |
| 37 | <u>45</u> | 965 | 34 | 1.01 | 2.53 | 1.2 | 1.19 | 50 | 60 |
| 38 | 25 | 965 | 20 | 1.72 | 4.30 | 2 | 1.16 | 50 | 60 |
| 39 | 25 | 965 | 34 | 1.01 | 2.53 | 1.2 | 1.19 | 50 | 60 |
| 40 | 0 | 860 | 40 | 4.45 | 11.12 | 9 | 2.02 | 60 | 60 |

TABLE 6

| PRODUCTION No. | COOLING RATE FROM 800° C. TO T3° C./° C./s | RETENTION TIME AT 630° C. TO 800° C./s | T3/° C. | COOLING RATE FROM T3° C. TO A TEMPERATURE EQUAL TO OUR HIGHER THAN 550° C. AND LOWER THAN T3° C./° C./s | WINDING TEMPERATURE/° C. | RETENTION TIME AFTER WINDING/min. | TEMPERATURE VARIATION RATE DURING RETENTION/° C./h |
|---|---|---|---|---|---|---|---|
| 1 | 40 | 12 | 680 | — | 420 | 290 | −20 |
| 2 | 50 | 15 | 680 | — | 450 | 300 | −10 |
| 3 | 50 | 14 | 695 | — | 468 | 250 | 10 |
| 4 | 60 | 16 | 695 | — | 472 | 290 | 30 |
| 5 | 50 | 18 | 670 | — | 438 | 280 | 40 |
| 6 | 40 | 11 | 670 | — | 447 | 240 | −20 |
| 7 | 80 | 10 | 665 | — | 459 | 100 | −40 |
| 8 | 70 | 16 | 665 | — | 387 | 150 | 30 |
| 9 | 70 | 8 | 675 | — | 459 | 90 | 20 |
| 10 | 60 | — | 675 | 15 | 364 | 50 | −10 |
| 11 | 60 | — | 660 | 18 | 483 | 260 | 40 |
| 12 | 50 | — | 685 | 10 | 415 | 290 | 20 |
| 13 | 50 | 3 | 685 | — | 456 | 300 | 30 |
| 14 | 40 | 5 | 675 | — | 369 | 300 | −10 |
| 15 | 40 | 5 | 680 | — | 550 | 300 | −2 |
| 16 | 60 | 7 | 665 | — | 405 | 250 | −10 |
| 17 | 5 | 30 | 655 | — | 150 | 400 | 40 |
| 18 | 70 | 10 | 695 | — | 395 | 150 | 20 |
| 19 | 40 | — | 670 | 25 | 450 | 10 | 10 |
| 20 | 50 | 60 | 680 | — | 259 | 40 | 50 |
| 21 | CRACKED DURING HOT ROLLING | | | | | | |
| 22 | CRACKED DURING HOT ROLLING | | | | | | |
| 23 | CRACKED DURING HOT ROLLING | | | | | | |
| 24 | CRACKED DURING HOT ROLLING | | | | | | |
| 25 | 50 | 10 | 680 | — | 380 | 100 | 10 |
| 26 | 50 | 8 | 670 | — | 375 | 120 | 15 |
| 27 | 40 | 9 | 675 | — | 400 | 160 | −15 |
| 28 | 40 | — | 680 | 10 | 425 | 120 | −20 |
| 29 | 60 | — | 655 | 15 | 410 | 150 | 17 |
| 30 | 90 | 4 | 695 | — | 375 | 200 | 25 |
| 31 | 40 | 15 | 675 | — | 360 | 300 | −10 |
| 32 | 20 | 10 | 680 | — | 480 | 240 | −5 |
| 33 | 40 | 13 | 665 | — | 490 | 250 | 25 |
| 34 | 40 | — | 680 | 8 | 425 | 100 | 35 |
| 35 | 40 | 5 | 680 | — | 550 | 300 | −2 |
| 36 | 50 | 3 | 685 | — | 456 | 300 | 30 |
| 37 | 50 | 3 | 685 | — | 456 | 300 | 30 |
| 38 | 50 | 3 | 685 | — | 456 | 300 | 30 |
| 39 | 50 | — | 685 | 30 | 456 | 300 | 30 |
| 40 | 50 | 10 | 685 | — | 380 | 100 | 10 |

TABLE 7

| PRODUCTION No. | STEEL No. | D1/— | D2/— | rC/— | r30/— | $f_{20}$/% | $d_F$/μm | $\sigma_{MA}$/μm |
|---|---|---|---|---|---|---|---|---|
| 1 | a | 2.6 | 2.2 | 0.87 | 1.04 | 8 | 7 | 4.8 |
| 2 | a | 2.2 | 2.1 | 0.9 | 0.96 | 6 | 5 | 4.7 |
| 3 | b | 2.9 | 2.8 | 0.79 | 1.05 | 8 | 9 | 4.2 |
| 4 | b | 2.7 | 2.7 | 0.85 | 1.02 | 9 | 5 | 4.6 |
| 5 | c | 3.5 | 3.2 | 0.72 | 1.1 | 8 | 5 | 3.9 |
| 6 | c | 3 | 2.8 | 0.73 | 1.1 | 7 | 8 | 3.8 |
| 7 | d | 3.9 | 3.5 | 0.7 | 1.08 | 8 | 4 | 4.6 |
| 8 | d | 2.9 | 2.7 | 0.9 | 1.06 | 8 | 3 | 4.7 |
| 9 | a | 3.5 | 2.9 | 0.75 | 1.05 | 9 | 9 | 4.8 |
| 10 | a | 2.1 | 2 | 0.95 | 1.02 | 8 | 8 | 5 |
| 11 | b | 2.9 | 2.6 | 0.72 | 1.06 | 9 | 7 | 4.8 |
| 12 | c | 3 | 2.9 | 0.85 | 0.95 | 7 | 6 | 3.6 |
| 13 | c | 3.8 | 3.8 | 0.75 | 0.98 | 6 | 5 | 3.2 |
| 14 | d | 3.4 | 3.1 | 0.75 | 1.05 | 8 | 6 | 4.5 |
| 15 | a | 7.2 | 6.4 | 0.67 | 1.24 | 12 | 7 | 5.1 |
| 16 | b | 5.2 | 4.3 | 0.64 | 1.15 | 15 | 16 | 4.6 |
| 17 | c | 5.8 | 4.5 | 0.71 | 1.08 | 14 | 12 | 8.3 |
| 18 | d | 6.4 | 4.9 | 0.68 | 1.18 | 15 | 10 | 7.6 |
| 19 | g | 7.6 | 5.4 | 0.65 | 1.22 | 75 | 12 | 8.7 |
| 20 | j | 7.1 | 6.4 | 0.65 | 1.15 | 14 | 7 | 5.8 |
| 21 | e | CRACKED DURING HOT ROLLING | | | | | | |
| 22 | f | CRACKED DURING HOT ROLLING | | | | | | |
| 23 | h | CRACKED DURING HOT ROLLING | | | | | | |
| 24 | i | CRACKED DURING HOT ROLLING | | | | | | |
| 25 | k | 5.8 | 4.8 | 0.87 | 1.05 | 8 | 2 | 2.5 |
| 26 | l | 3.8 | 3.7 | 0.78 | 1.1 | 10 | 5 | 5.5 |
| 27 | m | 5.9 | 5 | 0.9 | 1.1 | 5 | 3 | 3.5 |
| 28 | n | 5.5 | 4.8 | 0.75 | 1.05 | 4 | 2 | 2.9 |
| 29 | o | 5.5 | 4.5 | 0.7 | 0.99 | 6 | 2 | 4.9 |
| 30 | p | 5.7 | 4.5 | 0.75 | 1.02 | 8 | 4 | 5.6 |
| 31 | q | 5.5 | 4.2 | 0.75 | 0.99 | 4 | 2 | 4.5 |
| 32 | r | 5.1 | 4.7 | 0.88 | 1.02 | 3 | 2 | 1.8 |
| 33 | s | 5.5 | 4.7 | 0.78 | 1.05 | 9 | 3 | 5.5 |
| 34 | t | 5.5 | 4.8 | 0.89 | 1.09 | 5 | 3 | 4.9 |
| 35 | a | 6.9 | 5.8 | 0.64 | 1.25 | 10 | 8 | 4.8 |
| 36 | c | 6.6 | 5.1 | 0.68 | 1.12 | 9 | 7 | 3.2 |
| 37 | c | 6.7 | 5 | 0.64 | 1.08 | 12 | 8 | 3.2 |
| 38 | c | 6.4 | 4.5 | 0.65 | 1.25 | 15 | 8 | 3.2 |
| 39 | c | 3.9 | 3.8 | 0.74 | 1.01 | 6 | 5 | 3.2 |
| 40 | j | 4.8 | 3.8 | 0.88 | 1.03 | 9 | 8 | 2.5 |

TABLE 8

| PRODUCTION No. | γ/% | F/% | B/% | P/% | M/% |
|---|---|---|---|---|---|
| 1 | 13.5 | 26 | 45 | 3 | 12.5 |
| 2 | 10.5 | 35 | 48 | 0 | 6.5 |
| 3 | 8.5 | 42 | 39 | 0 | 10.5 |
| 4 | 10.6 | 38 | 40 | 0 | 11.4 |
| 5 | 7.8 | 42 | 36 | 10 | 4.2 |
| 6 | 16.8 | 39 | 41 | 0 | 3.2 |
| 7 | 14.8 | 22 | 45 | 7 | 11.2 |
| 8 | 14.2 | 26 | 42 | 5 | 12.8 |
| 9 | 13 | 25 | 40 | 4 | 18 |
| 10 | 7.8 | 47 | 29 | 2 | 14.2 |
| 11 | 10 | 39 | 39 | 0 | 12 |
| 12 | 10.5 | 42 | 39 | 0 | 8.5 |
| 13 | 10.6 | 38 | 42 | 0 | 9.4 |
| 14 | 12.6 | 21 | 38 | 10 | 18.4 |
| 15 | 4.8 | 20.8 | 70 | 4 | 0.4 |
| 16 | 3.9 | 35 | 36 | 8 | 17.1 |
| 17 | 4.7 | 52 | 0 | 0 | 43.3 |
| 18 | 12.5 | 23 | 43 | 3 | 18.5 |
| 19 | 3.6 | 22 | 5 | 25 | 44.4 |
| 20 | 0.5 | 62 | 8 | 0 | 29.5 |
| 21 | CRACKED DURING HOT ROLLING | | | | |
| 22 | CRACKED DURING HOT ROLLING | | | | |
| 23 | CRACKED DURING HOT ROLLING | | | | |
| 24 | CRACKED DURING HOT ROLLING | | | | |
| 25 | 2.5 | 45 | 39 | 2 | 11.5 |
| 26 | 3.5 | 29 | 45 | 6 | 16.5 |
| 27 | 3.7 | 34 | 45 | 7 | 10.3 |
| 28 | 8.9 | 26 | 46 | 0 | 19.1 |
| 29 | 12.4 | 27 | 55 | 0 | 5.6 |
| 30 | 5.8 | 24 | 55 | 0 | 15.2 |
| 31 | 4.5 | 36 | 45 | 0 | 14.5 |
| 32 | 3.8 | 36 | 54 | 4 | 2.2 |
| 33 | 14.5 | 25 | 51 | 4 | 5.5 |
| 34 | 7.8 | 44 | 35 | 10 | 3.2 |
| 35 | 3 | 20.8 | 71.8 | 4 | 0.4 |
| 36 | 10.5 | 40 | 43 | 0 | 6.5 |
| 37 | 10.8 | 42 | 40 | 0 | 7.2 |
| 38 | 10.5 | 42 | 39 | 0 | 8.5 |
| 39 | 1.8 | 20 | 38 | 32 | 8.2 |
| 40 | 0.8 | 48 | 45 | 1 | 5.2 |

TABLE 9

| PRODUCTION No. | TS/ MPa | EL/ % | λ/ % | d/RmC | TS × λ/ MPa % | TS × EL/ MPa % | REMARKS |
|---|---|---|---|---|---|---|---|
| 1 | 1026 | 20 | 70 | 3.3 | 71820 | 20520 | EXAMPLE |
| 2 | 985 | 30 | 80 | 3.2 | 78800 | 29550 | EXAMPLE |
| 3 | 859 | 35 | 85 | 3.2 | 73015 | 30065 | EXAMPLE |
| 4 | 1055 | 18 | 75 | 2.3 | 79125 | 18990 | EXAMPLE |
| 5 | 850 | 25 | 80 | 2.7 | 68000 | 21250 | EXAMPLE |
| 6 | 1148 | 18 | 40 | 2.3 | 45920 | 20664 | EXAMPLE |
| 7 | 1450 | 13 | 30 | 2.1 | 43500 | 18850 | EXAMPLE |
| 8 | 1426 | 14 | 35 | 3.3 | 49910 | 19964 | EXAMPLE |
| 9 | 760 | 28 | 60 | 3.2 | 45600 | 21280 | EXAMPLE |
| 10 | 735 | 20 | 90 | 3.2 | 66150 | 14700 | EXAMPLE |
| 11 | 890 | 16 | 100 | 2.7 | 89000 | 14240 | EXAMPLE |
| 12 | 788 | 19 | 80 | 2.3 | 63040 | 14972 | EXAMPLE |
| 13 | 850 | 19 | 70 | 1.5 | 59500 | 16150 | EXAMPLE |
| 14 | 1056 | 18 | 40 | 1.6 | 42240 | 19008 | EXAMPLE |
| 15 | 805 | 15 | 35 | 1.1 | 28175 | 12075 | COMPARATIVE EXAMPLE |
| 16 | 840 | 7 | 25 | 1.2 | 21000 | 5880 | COMPARATIVE EXAMPLE |
| 17 | 780 | 16 | 25 | 1.2 | 19500 | 12480 | COMPARATIVE EXAMPLE |
| 18 | 1609 | 8 | 10 | 1.2 | 16090 | 12872 | COMPARATIVE EXAMPLE |
| 19 | 948 | 12 | 30 | 1.1 | 28440 | 11376 | COMPARATIVE EXAMPLE |
| 20 | 489 | 32 | 60 | 1.2 | 29340 | 15648 | COMPARATIVE EXAMPLE |
| 21 | CRACKED DURING HOT ROLLING | | | | | | COMPARATIVE EXAMPLE |
| 22 | CRACKED DURING HOT ROLLING | | | | | | COMPARATIVE EXAMPLE |
| 23 | CRACKED DURING HOT ROLLING | | | | | | COMPARATIVE EXAMPLE |
| 24 | CRACKED DURING HOT ROLLING | | | | | | COMPARATIVE EXAMPLE |
| 25 | 457 | 39 | 80 | 2.5 | 36560 | 17823 | EXAMPLE |
| 26 | 594 | 31 | 78 | 2.1 | 46332 | 18414 | EXAMPLE |
| 27 | 764 | 27 | 45 | 3.1 | 34380 | 20628 | EXAMPLE |
| 28 | 793 | 25 | 60 | 2.7 | 47580 | 19825 | EXAMPLE |
| 29 | 864 | 23 | 55 | 1.9 | 47520 | 19872 | EXAMPLE |
| 30 | 1126 | 20 | 35 | 1.7 | 39410 | 22520 | EXAMPLE |
| 31 | 945 | 25 | 32 | 1.8 | 30240 | 23625 | EXAMPLE |
| 32 | 602 | 32 | 75 | 1.7 | 45150 | 19264 | EXAMPLE |
| 33 | 1015 | 24 | 31 | 1.5 | 31465 | 24360 | EXAMPLE |
| 34 | 530 | 34 | 95 | 1.6 | 50350 | 18020 | EXAMPLE |
| 35 | 750 | 11 | 21 | 1.3 | 15750 | 8250 | COMPARATIVE EXAMPLE |
| 36 | 790 | 18 | 35 | 1.3 | 27650 | 14220 | COMPARATIVE EXAMPLE |
| 37 | 820 | 20 | 30 | 1.3 | 24600 | 16400 | COMPARATIVE EXAMPLE |
| 38 | 830 | 22 | 35 | 1.3 | 29050 | 18260 | COMPARATIVE EXAMPLE |
| 39 | 870 | 10 | 12 | 1.1 | 10440 | 8700 | COMPARATIVE EXAMPLE |
| 40 | 440 | 30 | 60 | 2.1 | 26400 | 13200 | COMPARATIVE EXAMPLE |

Production Nos. 1 to 14, and 25 to 34 satisfy the conditions of the present invention, and thus d/RmC, TS×λ, and TS×EL of the steel sheets that were obtained in the production numbers were excellent. In addition, when the production conditions were optimized, d/RmC, TS×λ, and TS×EL were further improved.

On the other hand, in Production Nos. 15 to 24, and 35, the conditions of the present invention were not satisfied, and thus at least one of d/RmC, TS×λ, and TS×EL of the steel sheet that was obtained was not sufficient.

Hereinbefore, the preferred examples of the present invention have been described, but the present invention is not limited to the examples. Addition, omission, substitution, and other modifications of configuration may be made within a range not departing from the essence of the present invention. The present invention is not limited by the above-described description, and is limited only by the attached claims.

INDUSTRIAL APPLICABILITY

With regard to TRIP steel, a hot-rolled steel sheet which is excellent in local deformability, in which orientation dependence of formability is small, and which is excellent in ductility, and a production method thereof are provided.

The invention claimed is:
1. A hot-rolled steel sheet being a steel sheet having a chemical composition, by mass %, of
C: 0.02% to 0.5%,
Si: 0.001% to 4.0%,
Mn: 0.001% to 4.0%,
Al: 0.001% to 4.0%,
P: 0.15% or less,
S: 0.03% or less,
N: 0.01% or less,
O: 0.01% or less, and the balance comprising Fe and unavoidable impurities, wherein a sum of a content of the Si and a content of the Al is 1.0% to 4.0% in the chemical composition of the steel sheet, an average pole density of an orientation group from {100}<011> to {223}<110>, which is a pole density expressed by an arithmetic average of pole densities of respective crystal orientations {100}<011>, {116}<110>, {114}<110>, {112}<110>, and {223}<110>, is 1.0 to 6.5, and a pole density of a crystal orientation {332}<113> is 1.0 to 5.0 in a sheet thickness central portion within a range of ⅝ to ⅜ of a sheet thickness, a microstructure of the steel sheet includes a plurality of grains, the microstructure of the steel sheet includes, by an area ratio, 2% to 30% of retained austenite, 20% to 50% of ferrite, 10% to 60% of bainite, 20% or less of pearlite, and 20% or less of martensite, and rC that is a Lankford value in a direction orthogonal to a rolling direction is 0.70 to 1.10, and r30 that is a Lankford value in a direction forming an angle of 30° with the rolling direction is 0.70 to 1.10.

2. The hot-rolled steel sheet according to claim 1,
wherein the chemical composition of the steel sheet further includes, by mass %, one or more selected from the group consisting of
Ti: 0.001% to 0.2%,
Nb: 0.001% to 0.2%,
V: 0.001% to 1.0%,
W: 0.001% to 1.0%,
Cu: 0.001% to 2.0%,
B: 0.0001% to 0.005%,
Mo: 0.001% to 1.0%,
Cr: 0.001% to 2.0%,
As: 0.0001% to 0.50%,
Mg: 0.0001% to 0.010%,
REM: 0.0001% to 0.1%,
Ca: 0.0001% to 0.010%,
Ni: 0.001% to 2.0%,
Co: 0.0001% to 1.0%,
Sn: 0.0001% to 0.2%, and
Zr: 0.0001% to 0.2%.

3. The hot-rolled steel sheet according to claim 1,
wherein a volume average diameter of the grains is 1 µm to 4 µm.

4. The hot-rolled steel sheet according to claim 1,
wherein the average pole density of the orientation group from {100}<011> to {223}<110> is 1.0 to 5.0, and the pole density of the crystal orientation {332}<113> is 1.0 to 4.0.

5. The hot-rolled steel sheet according to claim 1,
wherein among the plurality of grains, an area ratio of grains which exceed 20 µm in grain size is limited to 10% or less.

6. The hot-rolled steel sheet according to claim 1,
wherein with regard to at least 100 grains of the retained austenite and the martensite, a standard deviation of a distance $L_{MA}$ between the grains closest to each other is 5 µm or less.

7. The hot-rolled steel sheet according to claim 2,
wherein a volume average diameter of the grains is 1 µm to 4 µm.

8. The hot-rolled steel sheet according to claim 2,
wherein the average pole density of the orientation group from {100}<011> to {223}<110> is 1.0 to 5.0, and the pole density of the crystal orientation {332}<113> is 1.0 to 4.0.

9. The hot-rolled steel sheet according to claim 2,
wherein among the plurality of grains, an area ratio of grains which exceed 20 µm in grain size is limited to 10% or less.

10. The hot-rolled steel sheet according to claim 2,
wherein with regard to at least 100 grains of the retained austenite and the martensite, a standard deviation of a distance $L_{MA}$ between the grains closest to each other is 5 µm or less.

11. A production method of a hot-rolled steel sheet, the production method comprising:
(a) a first hot-rolling process, wherein the first hot-rolling process comprises rolling the steel, at least one or more times, at a rolling reduction ratio of 40% or more and a temperature range of 1,000° C. to 1,200° C.
wherein the steel comprises, by mass %,
C: 0.02% to 0.5%,
Si: 0.001% to 4.0%,
Mn: 0.001% to 4.0%,
Al: 0.001% to 4.0%,
P: 0.15% or less,
S: 0.03% or less,
N: 0.01% or less,
O: 0.01% or less, and
the balance comprising Fe and unavoidable impurities, and
wherein a sum of a content of the Si and a content of the Al is 1.0% to 4.0%;
(b) a second hot-rolling process of performing hot rolling,
wherein the second hot-rolling process is controlled to include large-rolling-reduction passes with a rolling reduction ratio of 30% or more in a temperature range of T1+30° C. to T1+200° C., wherein T1 is calculated by a following Expression 1,
wherein an accumulative rolling reduction ratio in the temperature range of T1+30° C. to T1+200° C. is 50% or more,
wherein an accumulative rolling reduction ratio in a temperature range, that is higher than or equal to $Ar_3°$ C. and lower than T1+30° C., is limited to 30% or less, and
wherein a rolling terminal temperature is $Ar_3°$ C. or higher, $Ar_3$ being calculated by the following formula:

$$Ar_3 = 879.4 - 516.1 \times C - 65.7 \times Mn + 38.0 \times Si + 274.7 \times [P]$$

wherein [C], [Mn], [Si] and [P] respectively represent a content of C, a content of Mn, a content of Si and a content of P, in mass percent;
(c) a primary cooling process of performing cooling,
wherein a standby time t (second) from completion of a final large-rolling-reduction pass among the large-rolling-reduction passes in step (b) to a start of the primary cooling process satisfies Expression 2;
(d) a separate cooling process of cooling the steel to a temperature T3, in ° C., within a range of 630° C. to 800° C. at an average cooling rate of 10° C./s to 100° C./s;
(e) a retention process of performing a retaining, wherein the steel is retained within the temperature range of 630° C. to 800° C. for 1 second to 20 seconds, or a slow cooling process of a slow cooling, wherein the steel is slowly cooled from the temperature T3, in ° C., to a temperature range within lower than T3, in ° C., and higher than or equal to 550° C. at an average cooling rate of 20° C./s or less;

(f) a winding process of performing a winding of the steel in a temperature range of 350° C. to 500° C.; and (g) an air cooling process of performing a cooling of the steel with air, wherein the steel is subjected to a temperature range control step of retaining the steel at the temperature range of 350° C. to 500° C. for 30 minutes to 300 minutes, and the steel is subsequently cooled by air;

wherein:

$$T1=850+10\times([C]+[N])\times[Mn] \quad \text{(Expression 1)}$$

wherein [N] represents a content of N, in mass percent;

$$t \leq 2.5 \times t1 \quad \text{(Expression 2)}$$

wherein t1 is expressed by the following Expression 3, $$t1=0.001\times((Tf-T1)\times P1/100)^2-0.109\times((Tf-T1)\times P1/100)+3.1 \quad \text{(Expression 3)}$$

wherein Tf represents a celsius temperature of the steel at the time of completion of the final large-rolling-reduction pass, and P1 represents a percentage of the rolling reduction ratio during the final large-rolling-reduction pass.

12. The production method of the hot-rolled steel sheet according to claim 11,
wherein the steel further comprises, by mass %, one or more selected from the group consisting of
Ti: 0.001% to 0.2%,
Nb: 0.001% to 0.2%,
V: 0.001% to 1.0%,
W: 0.001% to 1.0%,
Cu: 0.001% to 2.0%,
B: 0.0001% to 0.005%,
Mo: 0.001% to 1.0%,
Cr: 0.001% to 2.0%,
As: 0.0001% to 0.50%,
Mg: 0.0001% to 0.010%,
REM: 0.0001% to 0.1%,
Ca: 0.0001% to 0.010%,
Ni: 0.001% to 2.0%,
Co: 0.0001% to 1.0%,
Sn: 0.0001% to 0.2%,
Zr: 0.0001% to 0.2% of Zr, and
wherein a temperature calculated by the following Expression 4 in place of the temperature calculated by the Expression 1 is set as the T1, $$T1=850+10\times([C]+[N])\times[Mn]+350\times[Nb]+250\times[Ti]+40\times[B]+10\times[Cr]+100\times[Mo]+100\times[V] \quad \text{(Expression 4)}$$

here, [C], [N], [Mn], [Nb], [Ti], [B], [Cr], [Mo], and [V] represent mass percentages of the content of C, the content of N, the content of Mn, the content of Nb, the content of Ti, the content of B, the content of Cr, the content of Mo, and the content of V in the steel, respectively.

13. The production method of the hot-rolled steel sheet according to claim 11,
wherein the standby time t (second) further satisfies the following Expression 5 using t1, $$t<t1 \quad \text{(Expression 5)}.$$

14. The production method of the hot-rolled steel sheet according to claim 11,
wherein the standby time t (second) further satisfies the following Expression 6 using t1, $$t1 \leq t \leq t1 \times 2.5 \quad \text{(Expression 6)}.$$

15. The production method of the hot-rolled steel sheet according to claim 11,
wherein in the primary cooling process, the average cooling rate is 50° C./s or more, a cooling temperature variation that is a difference between a steel temperature at the start time of a cooling and a steel temperature at the finish time of the cooling is 40° C. to 140° C., and the steel temperature at the finish time of the cooling is T1+100° C. or lower.

16. The production method of the hot-rolled steel sheet according to claim 11,
wherein the final large-rolling-reduction pass is a final pass in the temperature range of T1+30° C. to T1+200° C.

17. The production method of the hot-rolled steel sheet according to claim 11,
wherein, in the temperature range control step, a temperature variation rate is −40° C./h to 40° C./h.

18. The production method of the hot-rolled steel sheet according to claim 11,
wherein the primary cooling process is performed between rolling stands.

19. The production method of the hot-rolled steel sheet according to claim 12,
wherein the standby time t (second) further satisfies the following Expression 5 using t1, $$t<t1 \quad \text{(Expression 5)}.$$

20. The production method of the hot-rolled steel sheet according to claim 12,
wherein the standby time t (second) further satisfies the following Expression 6 using t1, $$t1 \leq t \leq t1 \times 2.5 \quad \text{(Expression 6)}.$$

* * * * *